(12) United States Patent
King, III et al.

(10) Patent No.: US 11,623,979 B2
(45) Date of Patent: Apr. 11, 2023

(54) STABILIZED POLYOLEFIN COMPOSITIONS COMPRISING BENZOFURANONES AND HINDERED AMINE LIGHT STABILIZERS

(71) Applicant: BASF SE, Ludwigshafen (DE)

(72) Inventors: Roswell E. King, III, Tarrytown, NY (US); Werner Hoelzl, Eschentzwiller (FR)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/628,573

(22) PCT Filed: Jul. 3, 2018

(86) PCT No.: PCT/US2018/040709
§ 371 (c)(1),
(2) Date: Jan. 3, 2020

(87) PCT Pub. No.: WO2019/010176
PCT Pub. Date: Jan. 10, 2019

(65) Prior Publication Data
US 2020/0216638 A1 Jul. 9, 2020

Related U.S. Application Data

(60) Provisional application No. 62/691,211, filed on Jun. 28, 2018.

(30) Foreign Application Priority Data

Jul. 6, 2017 (EP) .................................... 17180079

(51) Int. Cl.
*C08K 5/524* (2006.01)
*C08K 5/521* (2006.01)
*C08L 23/06* (2006.01)
*C08L 23/12* (2006.01)

(52) U.S. Cl.
CPC .............. *C08K 5/524* (2013.01); *C08K 5/521* (2013.01); *C08L 23/06* (2013.01); *C08L 23/12* (2013.01); *C08L 2207/062* (2013.01); *C08L 2207/066* (2013.01)

(58) Field of Classification Search
CPC ................... C08L 23/06; C08L 23/12
See application file for complete search history.

(56) References Cited

U.S. PATENT DOCUMENTS

| | | |
|---|---|---|
| 5,308,901 A | 5/1994 | Hobbs et al. |
| 6,448,357 B1 | 9/2002 | Hamada et al. |
| 6,521,681 B1 | 2/2003 | Zingg |
| 7,109,260 B2 | 9/2006 | Kaprinidis et al. |
| 9,951,207 B2 | 4/2018 | Hoelzl et al. |
| 10,072,136 B2 | 9/2018 | Hoelzl et al. |
| 10,259,931 B2 | 4/2019 | Hoelzl et al. |
| 10,590,263 B2 | 3/2020 | Hoelzl et al. |
| 2007/0021537 A1 | 1/2007 | Chafin et al. |
| 2007/0197697 A1 | 8/2007 | Botkin et al. |
| 2008/0242788 A1 | 10/2008 | Kimura |
| 2017/0066905 A1 | 3/2017 | Hoelzl et al. |
| 2017/0226323 A1* | 8/2017 | Hoelzl .................. C08K 5/529 |
| 2019/0010307 A1 | 1/2019 | King et al. |
| 2019/0010315 A1 | 1/2019 | King et al. |

FOREIGN PATENT DOCUMENTS

| | | |
|---|---|---|
| CN | 1172176 C | 10/2004 |
| DE | 197 28 214 A1 | 1/1998 |
| WO | 2004/031286 A1 | 4/2004 |
| WO | 2015055563 A1 | 4/2015 |
| WO | 2015/121445 | 8/2015 |
| WO | 2016/020322 | 2/2016 |
| WO | 2017/025431 | 2/2017 |
| WO | 2019/007935 | 1/2019 |

OTHER PUBLICATIONS

European Search Report for Application No. 18827769.3 completed on Mar. 19, 2021, 4 pgs.
U.S. Appl. No. 16/026,270, filed Jul. 3, 2018.
U.S. Appl. No. 16/026,288, filed Jul. 3, 2018.
U.S. Appl. No. 16/026,343, filed Jul. 3, 2018.
U.S. Appl. No. 16/026,386, filed Jul. 3, 2018.

* cited by examiner

*Primary Examiner* — Wenwen Cai
(74) *Attorney, Agent, or Firm* — Lowenstein Sandler LLP

(57) ABSTRACT

Polyolefin compositions comprising i) a polyolefin, ii) one or more phosphorus—containing benzofuranone compounds and iii) one or more hindered amine light stabilizers are provided excellent protection against discoloration and enhanced thermal stability during melt processing as exhibited by improved retention of molecular weight and maintenance of polymer molecular architecture.

13 Claims, No Drawings

STABILIZED POLYOLEFIN COMPOSITIONS COMPRISING BENZOFURANONES AND HINDERED AMINE LIGHT STABILIZERS

CROSS-REFERENCE TO RELATED APPLICATION(S)

This application is a national phase of International Application No. PCT/US2018/040709, filed on Jul. 3, 2018, which claims the benefit of European Patent Application No. 17180079.0, filed on Jul. 6, 2017 and U.S. provisional application 62/691,211 filed on Jun. 28, 2018. The contents of these applications are hereby incorporated by reference in their entirety.

The disclosure relates to polyolefin compositions comprising 3-phenyl-benzofuran-2-one compounds containing phosphorus and certain hindered amine light stabilizers. The polyolefin compositions exhibit excellent color performance and enhanced thermal stability during melt processing.

Traditional phenolic/phosphite antioxidant blends have been used successfully for decades to provide good melt flow control and acceptable color maintenance to polyolefins. However, there is a growing demand for lower color of polyolefin articles and improved color maintenance.

SUMMARY

Accordingly, disclosed are polyolefin compositions comprising i) a polyolefin, ii) one or more phosphorus-containing benzofuranone compounds and iii) one or more hindered amine light stabilizers (HALS). The phosphorus-containing benzofuranone compounds may be of formula I-p1, I-p2, I-o1, I-o2, I-m1 or I-m2, further described herein below. Also disclosed are additive compositions comprising the phosphorus-containing benzofuranone compounds and the hindered amine light stabilizers.

Also disclosed are methods of stabilizing a polyolefin against deleterious effects of heat, light and oxygen, the method comprising incorporating into the polyolefin ii) one or more benzofuranone compounds selected from the group consisting of formula I-p1, I-p2, I-o1, I-o2, I-m1 and I-m2 and iii) one or more hindered amine light stabilizers. Deleterious effects of heat, light and oxygen may lead to undesired color.

DETAILED DISCLOSURE

The 3-phenyl-benzofuran-2-one compounds containing phosphorus may be of formula I-p1, I-p2, I-o1, I-o2, I-m1 or I-m2 (also referred to herein as "benzofuran-2-one" or "benzofuranone" compounds).

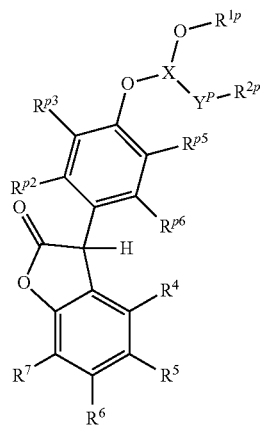

I-p1

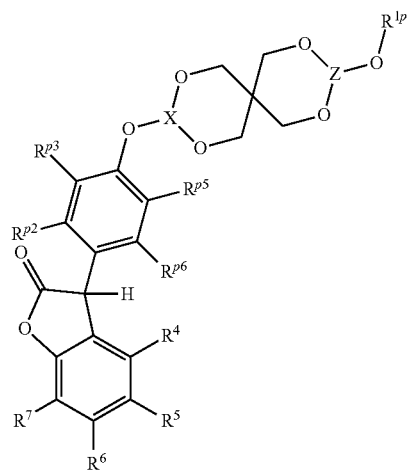

I-p2

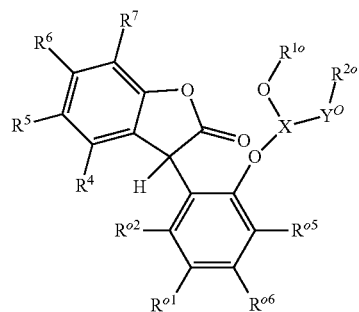

I-o1

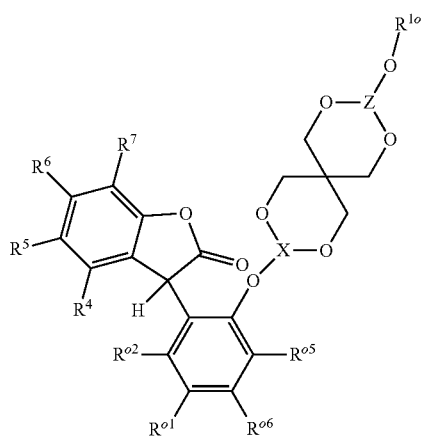

I-o2

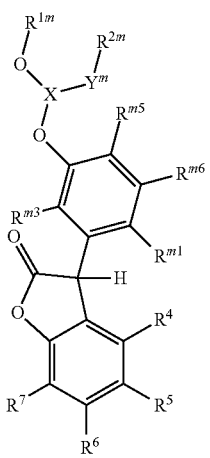

I-m1

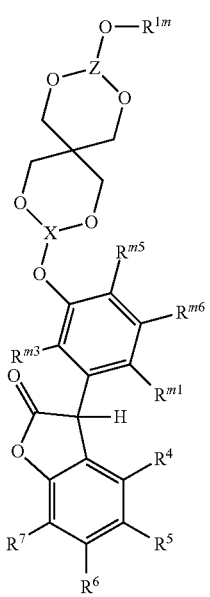

I-m2 wherein

X and Z are independently P or P=O; $Y^p$, $Y^o$ and $Y^m$ are oxygen or represent a covalent bond;

when $Y^p$, $Y^o$ and $Y^m$ are oxygen, $R^{1p}$ represents one of subformulae II-p, II-o or II-m

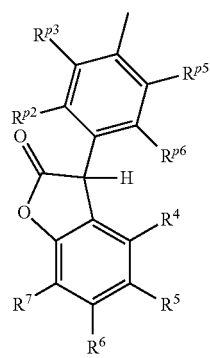

II-p

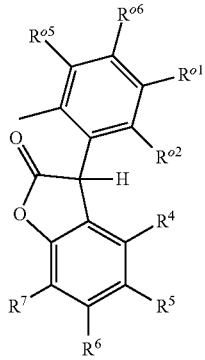

II-o

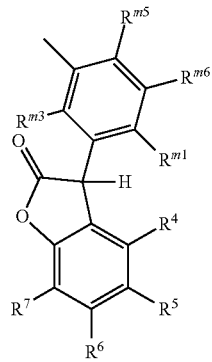

II-m $R^{1o}$ represents one of subformulae II-o or II-m, $R^{1m}$ represents subformula II-m, or $R^{1p}$ together with $R^{2p}$, $R^{1o}$ together with $R^{2o}$ and $R^{1m}$ together with $R^{2m}$ represent one of subformulae III, IV or V

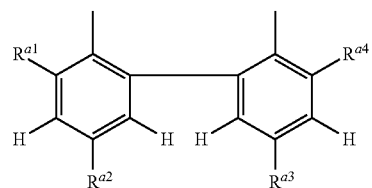

III

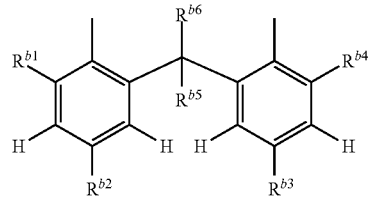

IV

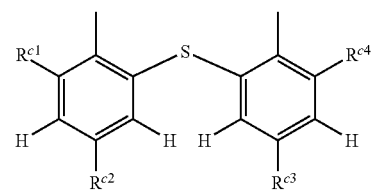

V or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{18}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$ represents one of subformulae II-p, II-o or II-m, $R^{2o}$ represents one of subformulae II-o or II-m, $R^{2m}$ represents subformula II-m, or $R^{2p}$ together with $R^{1p}$, $R^{2o}$ together with $R^{1o}$ and $R^{2m}$ together with $R^{1m}$ represent one of subformulae III, IV or V, or $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom; when $Y^p$, $Y^o$ and $Y^m$ represent a covalent bond, $R^{1p}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, or halogen; $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl, $R^{o1}$, $R^{o2}$, $R^{o5}$ and $R^{o6}$ are each independently hydrogen or $C_1$-$C_8$-alkyl, $R^{m1}$, $R^{m3}$, $R^{m5}$ and $R^{m6}$ are each independently hydrogen or $C_1$-$C_8$-alkyl, $R^{a1}$, $R^{a2}$, $R^{a3}$ and $R^{a4}$ are each independently hydrogen or $C_1$-$C_8$-alkyl, $R^{b1}$, $R^{b2}$, $R^{b3}$, $R^{b4}$, $R^{b5}$ and $R^{b6}$ are each independently hydrogen or $C_1$-$C_8$-alkyl and $R^{c1}$, $R^{c2}$, $R^{c3}$ and $R^{c4}$ are each independently hydrogen or $C_1$-$C_8$-alkyl.

The one point of attachment at subformulae II-p, II-o or II-m is denoted by the end of the line which does not carry a character and is blank. The two points of attachment at subformulae III, IV or V are denoted each by the end of the respective line which does not carry a character and is blank. When $R^{1p}$ together with $R^{2p}$, $R^{1o}$ together with $R^{2o}$ and $R^{1m}$ together with $R^{2m}$ represent one of subformulae III, IV or V, then $R^{2p}$ together with $R^{1p}$, $R^{2o}$ together with $R^{1o}$ and $R^{2m}$ together with $R^{1m}$ represent the same subformula.

A compound of formula I-p1, I-p2, I-o1, I-o2, I-m1 or I-m2 possesses at least one asymmetric carbon atom, i.e. a carbon atom at the 3-position of the benzofuran-2-one structural unit. Further asymmetric carbon atoms can be present in alkyl substituents with at least four carbon atoms. A phosphorus atom, which is substituted with three different substituents, can show a hindered inversion, which can lead dependent on temperature to an asymmetric phosphorus atom. The invention relates to any one of these enantiomers, resulting diastereomers or mixtures thereof.

$C_8$-$C_{10}$-aryl, which is unsubstituted or substituted by $C_1$-$C_8$-alkyl, $C_1$-$C_8$-alkoxy, halogen or one phenyl, is for example phenyl, 2-methyl-phenyl, 3-methyl-phenyl, 4-methyl-phenyl, 2,4-dimethyl-phenyl, 3,5-dimethyl-phenyl, 4-(1,1-dimethylethyl)-phenyl, 4-(1,1,3,3-tetramethyl-pentyl)-phenyl, naphthalen-1-yl, naphthalen-2-yl, 6-methyl-naphthalen-2-yl, 4-phenyl-phenyl, 2-methoxy-phenyl, 3-methoxy-phenyl, 4-methoxy-phenyl, 2-ethoxyphenyl, 3-ethoxy-phenyl, 3-(n-propoxy)-phenyl, 4-(1,1-dimethyl-ethoxy)-phenyl, 2-chloro-phenyl, 3-chlorophenyl, 4-chloro-phenyl, 2-chloro-4-methylphenyl. In some embodiments, $C_8$-$C_{10}$-aryl is unsubstituted or substituted by $C_1$-$C_8$-alkyl or $C_1$-$C_8$-alkoxy. In certain embodiments, aryl is phenyl which is unsubstituted or substituted by $C_1$-$C_8$-alkyl. In other embodiments, aryl is phenyl.

$C_1$-$C_8$-alkyl is linear or branched and for example methyl, ethyl, n-propyl, 1-methyl-ethyl, n-butyl, 1-methyl-propyl, 2-methyl-propyl, 1,1-dimethyl-ethyl, n-pentyl, 1-methyl-butyl, 3-methyl-butyl, n-hexyl, 1-methyl-pentyl, 2-methyl-pentyl, 4-methyl-pentyl, 2-ethyl-butyl, n-heptyl, 1-methyl-hexyl, n-octyl, 1-methyl-heptyl, 2-ethyl-hexyl, 5,5-dimethyl-hexyl or 1,1,3,3-tetramethyl-butyl. In some embodiments, alkyl is $C_1$-$C_4$-alkyl or $C_8$-alkyl, for example methyl, ethyl, 1-methyl-ethyl, 1-methyl-propyl 1,1-dimethyl-ethyl or 1,1,3,3-tetramethyl-butyl. In certain embodiments, alkyl is $C_1$-$C_4$-alkyl, such as methyl, ethyl, 1-methyl-ethyl, 1-methyl-propyl 1,1-dimethyl-ethyl and in certain other embodiments is methyl, 1-methyl-propyl or 1,1-dimethyl-ethyl.

$C_1$-$C_8$-alkoxy is linear or branched and for example methoxy, ethoxy, n-propoxy, 1-methyl-ethoxy, n-butoxy, 1-methyl-propoxy, 1,1-dimethyl-ethoxy, n-pentoxy, 2-methyl-pentoxy, 2-ethyl-butoxy, 1-methyl-hexoxy, n-octyloxy, 1-methyl-heptoxy, 2-ethyl-hexoxy, 1,1,3,3-tetramethyl-butoxy. In some embodiments, alkoxy is $C_1$-$C_4$-alkoxy such as methoxy.

Halogen is for example a fluorine atom (fluoro), chlorine atom (chloro), a bromine atom (bromo) or an iodine atom (iodo). In certain embodiments, halogen is a chlorine atom or a fluorine atom, in some embodiments, halogen is a fluorine atom.

$C_1$-$C_{18}$-alkyl is linear or branched and for example methyl, ethyl, n-propyl, 1-methyl-ethyl, n-butyl, 1-methyl-propyl, 2-methyl-propyl, 1,1-dimethyl-ethyl, n-pentyl, 1-methyl-butyl, 3-methyl-butyl, n-hexyl, 1-methyl-pentyl, 2-methyl-pentyl, 4-methyl-pentyl, 2-ethyl-butyl, n-heptyl, 1-methyl-hexyl, n-octyl, 1-methyl-heptyl, 2-ethyl-hexyl, 5,5-dimethyl-hexyl, 1,1,3,3-tetramethyl-butyl, n-nonyl, 2-ethyl-heptyl, n-decyl, undecyl, n-dodecyl, tridecyl, tetra-decyl, pentadecyl, n-hexadecyl or n-octadecyl. In some embodiments, $C_1$-$C_{18}$-alkyl is a linear or branched $C_1$-$C_{12}$-alkyl.

$C_3$-$C_{16}$-cycloalkyl is unsubstituted or substituted by $C_1$-$C_4$-alkyl and is for example cyclobutyl, cyclopentyl, 3,4-dimethyl-cyclopentyl, cyclohexyl, 4-methyl-cyclohexyl, 4-(1-methylethyl)-cyclohexyl, 4-(1,1-dimethylethyl)-cyclohexyl, 3,5-dimethyl-cyclohexyl, 5-methyl-2-(1-methyl-ethyl)-cyclohexyl, cycloheptyl, cyclooctyl or cyclododecyl. In certain embodiments, $C_3$-$C_{16}$-cycloalkyl is $C_5$-$C_7$-cycloalkyl such as cyclohexyl.

$C_7$-$C_{13}$-aralkyl is for example benzyl, 4-methyl-benzyl, 2-phenyl-ethyl, 3,5-dimethylbenzyl, 1-phenyl-1,1-dimethyl-methyl, 3-phenyl-propyl, 3-phenyl-2-methyl-propyl, 3,5-di-tert-butyl-benzyl or 4-phenyl-phenyl-methyl. In certain embodiments, aralkyl is benzyl. $C_2$-$C_{18}$-alkenyl is linear or branched and for example vinyl, allyl, Z- or E-but-2-ene-yl, or E-but-3-ene-yl, Z- or E-pent-2-ene-yl, pent-4-ene-yl, Z- or E-2-methyl-but-2-ene-yl, Z- or E-3-methyl-but-3-ene-yl, Z- or E-hex-1-ene-yl, Z- or E-hexadec-9-ene-yl or Z- or E-octadec-9-ene-yl, (9Z,12Z)-octadeca-9,12-diene-yl or (9Z,12Z,15Z)-octadeca-9,12,15-triene-yl. In certain embodiments, alkenyl is allyl.

$C_2$-$C_{30}$-alkyl, which is interrupted by one or more oxygen atoms, is linear or branched and for example methoxy-methyl, 2-methoxy-ethyl, 2-ethoxy-ethyl, 2-(2-methoxy-ethoxy)-ethyl, 2-n-butoxy-ethyl, 2-[2-(2-methoxy-ethoxy)-ethoxy]-ethyl, 2-[2-[2-(2-methoxy-ethoxy)-ethoxy]-ethoxy]-ethyl, 2-(2-methoxy-1-methyl-ethoxy)-1-methyl-ethyl, 3-(n-propoxy)-propyl, 2-[2-[2-(2-n-butoxy-ethoxy)-ethoxy]-ethoxy]-ethyl, 2-[2-(2-n-butoxy-2-methyl-ethoxy)-2-methyl-ethoxy]-2-methyl-ethyl or 2-[(2-n-lauryl)-ethoxy]-ethyl. In some embodiments, alkyl interrupted by one or more oxygen atoms is 2-methoxy-ethyl or 2-ethoxy-ethyl.

$C_2$-$C_{16}$-alkyl, which is interrupted by one sulfur atom, is linear or branched and for example 2-(methyl-sulfanyl)-ethyl, 3-thiaundecyl or 3-thiapentadecyl.

In some embodiments, benzofuranones are of formula I-p1, I-p2, I-o1, I-o2, I-m1 or I-m2, wherein $R^4$ and $R^6$ are hydrogen and $R^5$ and $R^7$ are each independently hydrogen or $C_1$-$C_8$-alkyl, for example hydrogen or $C_1$-$C_4$-alkyl. In certain embodiments, $R^4$, $R^6$ and $R^7$ are hydrogen and $R^5$ is hydrogen or $C_1$-$C_8$-alkyl, for example hydrogen or $C_1$-$C_4$-alkyl. In some embodiments, $R^{p2}$ and $R^{p6}$ are each independently hydrogen or $C^1$-alkyl, $R^{p3}$ and $R^{p5}$ are each independently hydrogen or $C_1$-$C_4$-alkyl, $R^{o1}$ and $R^{o6}$ are each independently hydrogen or $C_1$-$C_8$-alkyl, $R^{o2}$ is hydrogen or $C_1$-alkyl and $R^{o5}$ is hydrogen or $C_1$-$C_4$-alkyl, $R^{1m}$ is hydrogen or $C_1$-alkyl, $R^{m3}$ and $R^{m5}$ are each independently hydrogen or $C_1$-$C_4$-alkyl and $R^{m6}$ is hydrogen or $C_1$-$C_8$-alkyl.

In certain embodiments, benzofuranones are of formula I-p1, I-p2, I-o1, I-o2, I-m1 or I-m2, wherein $R^{p2}$ and $R^{p6}$ are hydrogen and $R^{p3}$ and $R^{p5}$ are each independently hydrogen or $C_1$-$C_4$-alkyl, $R^{o1}$ is hydrogen or $C_1$-$C_8$-alkyl, $R^{o2}$ is hydrogen, $R^{o5}$ and $R^{o6}$ are independently hydrogen or $C_1$-$C_4$-alkyl, $R^{m1}$ and $R^{m3}$ are hydrogen or $C_1$-alkyl, $R^{m5}$ is hydrogen or $C_1$-$C_3$-alkyl and $R^{m6}$ is hydrogen or $C_1$-$C_8$-alkyl. In other embodiments, $R^{p2}$ and $R^{p6}$ are hydrogen and $R^{p3}$ and $R^{p5}$ are each independently hydrogen or $C_1$-$C_4$-alkyl, wherein one of $R^{p3}$ and $R^{p5}$ is not $C_4$-alkyl, $R^{o1}$ is hydrogen or $C_1$-$C_8$-alkyl, $R^{o2}$ is hydrogen, $R^{o5}$ is hydrogen or $C_1$-$C_3$-alkyl and $R^{o6}$ is hydrogen or $C_1$-$C_4$-alkyl and $R^{m1}$ and $R^{m3}$ are hydrogen or $C_1$-alkyl, $R^{m5}$ is hydrogen or $C_1$-$C_3$-alkyl and $R^{m6}$ is hydrogen or $C_1$-$C_8$-alkyl.

In some embodiments, $R^{p2}$ and $R^{p6}$ are hydrogen and one of $R^{p3}$ and $R^{p5}$ is hydrogen, whereas the other one is hydrogen or $C_1$-$C_4$-alkyl, $R^{o1}$ is hydrogen or $C_1$-$C_8$-alkyl, $R^{o2}$ is hydrogen, $R^{o5}$ is hydrogen or $C^1$-alkyl and $R^{o6}$ is hydrogen or $C_1$-$C_4$-alkyl and $R^{m1}$, $R^{m3}$ and $R^{m5}$ are hydrogen and $R^{m6}$ is hydrogen or $C_1$-$C_8$-alkyl. In certain embodiments, $R^{a1}$, $R^{a2}$, $R^{a3}$ and $R^{a4}$ are each independently hydrogen or $C_1$-$C_4$-alkyl, $R^{b1}$, $R^{b2}$, $R^{b3}$, $R^{b4}$, $R^{b5}$ and $R^{b6}$ are each independently hydrogen or $C_1$-$C_4$-alkyl and $R^{c1}$, $R^{c2}$, $R^{c3}$ and $R^{c4}$ are each independently hydrogen or $C_1$-$C_4$-alkyl.

In some embodiments, $R^{a1}$, $R^{a2}$, $R^{a3}$ and $R^{a4}$ are each independently hydrogen or $C_1$-$C_4$-alkyl, $R^{b1}$, $R^{b2}$, $R^{b3}$, $R^{b4}$ are each independently hydrogen or $C_1$-$C_4$-alkyl and one of $R^{b5}$ and $R^{b6}$ is $C_1$-$C_4$-alkyl, whereas the other one is hydrogen and $R^{c1}$, $R^{c2}$, $R^{c3}$ and $R^{c4}$ are each independently hydrogen or $C_1$-$C_4$-alkyl. In certain embodiments, $Y^p$, $Y^o$ and $Y^m$ rare oxygen or represent a covalent bond; when $Y^p$, $Y^o$ and $Y^m$ are oxygen, $R^{1p}$ represents one of subformulae II-p, II-o or II-m, $R^{1o}$ represents one of subformulae II-o or II-m, $R^{1m}$ represents subformula II-m, or $R^{1p}$ together with $R^{2p}$, $R^{1o}$ together with $R^{2o}$ and $R^{1m}$ together with $R^{2m}$ represent one of subformulae III, IV or V, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl and $R^{2p}$ represents one of subformulae II-p, II-o or II-m, $R^{2o}$ represents one of subformulae II-o or II-m, $R^{2m}$ represents subformula II-m, or $R^{2p}$ together with $R^{1p}$, $R^{2o}$ together with $R^{1o}$ and $R^{2m}$ together with $R^{1m}$ represent one of subformulae III, IV or V, or $R^{2p}$, $R^{2o}$ and $R^{2m}$ are $C_6$-$C_{10}$-aryl, which is unsubstituted or substituted by $C_1$-$C_6$-alkyl, $C_1$-$C_{18}$-alkyl, $C_3$-$C_{16}$-cycloalkyl or $C_2$-$C_{18}$-alkenyl; when $Y^p$, $Y^o$ and $Y^m$ represent a covalent bond, $R^{1p}$ represents one of subformulae II-o or II-m, $R^{1m}$ represents subformula II-m, or $R^{1p}$, $R^{1o}$ and $R^{1m}$ are $C_6$-$C_{12}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl and $R^{2p}$, $R^{2o}$ and $R^{2m}$ are $C_6$-$C_{10}$-aryl, which is unsubstituted or substituted by $C_1$-$C_8$-alkyl, or halogen, which is chloro or fluoro.

In some embodiments, $Y^p$, $Y^o$ and $Y^m$ are oxygen or represent a covalent bond; when $Y^p$, $Y^o$ and $Y^m$ are oxygen, $R^{1p}$ represents subformula II-p, $R^{1o}$ represents the formulae II-o, $R^{1m}$ represents subformula II-m, or $R^{1p}$ together with $R^{2p}$, $R^{1o}$ together with $R^{2o}$ and $R^{1m}$ together with $R^{2m}$ represent one of subformulae III, IV or V, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl and $R^{2p}$ represents subformula II-p, $R^{2o}$ represents subformula II-o, $R^{2m}$ represents subformula II-m, or $R^{2p}$ together with $R^{1p}$, $R^{2o}$ together with $R^{1o}$ and $R^{2m}$ together with $R^{1m}$ represent one of subformulae III, IV or V, or $R^{2p}$, $R^{2o}$ and $R^{2m}$ are $C_6$-$C_{10}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl; when $Y^p$, $Y^o$ and $Y^m$ represent a covalent bond, $R^{1p}$ represents subformula II-p, $R^{1o}$ represents subformula II-o, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl; when $Y^p$, $Y^o$ and $Y^m$ represent a covalent bond, $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl and $R^{2p}$, $R^{2o}$ and $R^{2m}$ are $C_6$-$C_{10}$-aryl, which is unsubstituted or substituted by $C_1$-$C_8$-alkyl, or halogen, which is chloro or fluoro.

In some embodiments, benzofuranones are of formula I-p1, I-p2, I-o1, I-o2, I-m1 or I-m2, wherein $Y^p$, $Y^o$ and $Y^m$ are oxygen or represent a covalent bond; when $Y^p$, $Y^o$ and $Y^m$ are oxygen, $R^{1p}$ represents subformula II-p, $R^{1o}$ represents the formulae II-o, $R^{1m}$ represents subformula II-m, or $R^{1p}$ together with $R^{2p}$, $R^{1o}$ together with $R^{2o}$ and $R^{1m}$ together with $R^{2m}$ represent one of subformulae III, IV or V, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl, $C_3$-$C_{16}$-cycloalkyl or $C_2$-$C_{18}$-alkenyl and $R^{2p}$ is $R^{1p}$, $R^{2o}$ is $R^{1o}$, $R^{2m}$ is $R^{1m}$, or $R^{2p}$ together with $R^{1p}$, $R^{2o}$ together with $R^{1o}$ and $R^{2m}$ together with $R^{1m}$ represent one of subformulae III, IV or V; when $Y^p$, $Y^o$ and $Y^m$ represent a covalent bond, $R^{1p}$ represents subformula II-p, $R^{1o}$ represents subformulae II-o, $R^{1m}$ represents subformula II-m and $R^{2p}$, $R^{2o}$ and $R^{2m}$ are $C_6$-$C_{10}$-aryl, which is unsubstituted or substituted by $C_1$-$C_8$-alkyl, or halogen, which is chloro or fluoro.

In some embodiments, benzofuranones are of formula I-p1, I-p2, I-o1, I-o2, I-m1 or I-m2, wherein $Y^p$, $Y^o$ and $Y^m$ are oxygen or represent a covalent bond; when $Y^p$, $Y^o$ and $Y^m$ are oxygen, $R^{1p}$ represents one of subformulae II-p, II-o or II-m, $R^{1o}$ represents one of subformulae II-o or II-m, $R^{1m}$ represents subformula II-m, or $R^{1p}$ together with $R^{2p}$, $R^{1o}$ together with $R^{2o}$ and $R^{1m}$ together with $R^{2m}$ represent one of subformulae III, IV or V, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl or $C_3$-$C_{16}$-cycloalkyl and $R^{2p}$ represents one of subformulae II-p, II-o or II-m, $R^{2o}$ represents one of subformulae II-o or II-m, $R^{2m}$ represents subformula II-m, or $R^{2p}$ together with $R^{1p}$, $R^{2o}$ together with $R^{1o}$ and $R^{2m}$ together with $R^{1m}$ represent one of subformulae III, IV or V, or $R^{2p}$, $R^{2o}$ and $R^{2m}$ are $C_6$-$C_{10}$-aryl, which is unsubstituted or substituted by $C_1$-$C_8$-alkyl, $C_1$-$C_{18}$-alkyl or $C_3$-$C_{16}$-cycloalkyl; when $Y^p$, $Y^o$ and $Y^m$ represent a covalent bond, $R^{1m}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl or $C_3$-$C_{16}$-cycloalkyl and $R^{2p}$, $R^{2o}$ and $R^{2m}$ are $C_6$-$C_{10}$-aryl, which is unsubstituted or substituted by $C_1$-$C_8$-alkyl or fluoro.

In certain embodiments, $Y^p$, $Y^o$ and $Y^m$ are oxygen or represent a covalent bond; when $Y^p$, $Y^o$ and $Y^m$ are oxygen, $R^{1p}$ represents one of subformulae II-p, II-o or II-m, $R^{1o}$ represents one of subformulae II-o or II-m, $R^{1m}$ represents subformula II-m, or $R^{1p}$ together with $R^{2p}$, $R^{1o}$ together with $R^{2o}$ and $R^{1m}$ together with $R^{2m}$ represent subformula III, or $R^{1p}$, $R^{1o}$ and $R^{1m}$ are $C_6$-$C_{10}$-aryl, which is unsubstituted or substituted by $C_1$-$C_8$-alkyl, or $C_1$-$C_{18}$-alkyl and $R^{2p}$ represents one of subformulae II-p, II-o or II-m, $R^{2o}$ represents one of subformulae II-o or II-m, $R^{2m}$ represents subformula II-m, or $R^{2p}$ together with $R^{1p}$, $R^{2o}$ together with $R^{1o}$ and $R^{2m}$ together with $R^{1m}$ represent subformula III, or $R^{2p}$, $R^{2o}$ and $R^{2m}$ are $C_6$-$C_{10}$-aryl, which is unsubstituted or substituted by $C_1$-$C_8$-alkyl, or $C_1$-$C_{18}$-alkyl; when $Y^p$, $Y^o$ and $Y^m$ represent a covalent bond, $R^{1p}$ represents one of subformulae II-p, II-o or II-m, $R^{1o}$ represents one of subformulae II-o or II-m, $R^{1m}$ represent subformula or II-m, or $R^{1p}$, $R^{1o}$ and $R^{1m}$ are $C_6$-$C_{10}$-aryl, which is unsubstituted or substituted by $C_1$-$C_8$-alkyl, or $C_1$-$C_{18}$-alkyl and $R^{2p}$, $R^{2o}$ and $R^{2m}$ are $C_6$-$C_{10}$-aryl, which is unsubstituted or substituted by $C_1$-$C_8$-alkyl, or fluoro.

In some embodiments, benzofuranones are of formula I-p1, I-p2, I-o1 or I-o2, wherein $Y^p$ and $Y^o$ are oxygen or represent a covalent bond; when $Y^o$ and $Y^o$ are oxygen, $R^{1p}$, $R^{2p}$, $R^{1o}$ or $R^{2o}$ does not represent subformula II-m; when $Y^p$ and $Y^o$ represent a covalent bond, $R^{1p}$ or $R^{1o}$ does not represent subformula II-m. In certain embodiments in compounds of formula I-p1 or I-p2, r is oxygen or represents a covalent bond; when $Y^p$ is oxygen, $R^{1p}$ or $R^{2p}$ does not represent subformulae II-o or II-m; when $Y^p$ represents a covalent bond, $R^{1p}$ does not represent subformulae II-o or II-m.

In some embodiments, benzofuranones are of formula I-p1, I-p2, I-o1, I-o2, I-m1 or I-m2, wherein $Y^p$, $Y^o$ and $Y^m$ are oxygen or represent a covalent bond; when $Y^p$, $Y^o$ and $Y^m$ are oxygen, $R^{1p}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$ represents one of subformulae II-p, II-o or II-m, $R^{2o}$ represents one of subformulae II-o or II-m, $R^{2m}$ represents subformula II-m, or $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom; when $Y^p$, $Y^{2o}$ and $Y^m$ represent a covalent bond, $R^{1p}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, or halogen.

In certain embodiments, the benzofuranones are of formula I-p1, I-p2, I-o1, I-o2, I-m1 or I-m2, wherein $Y^p$, $Y^o$ and $Y^m$ rare oxygen. In some embodiments, the benzofuranones are of formula I-p or I-o, wherein $Y^p$ and $Y^o$ are oxygen and $R^{1p}$, $R^{2p}$, $R^{1o}$ or $R^{2o}$ does not represent subformula II-m. In other embodiments, benzofuranones are of formula I-p1, I-p2, I-o1, I-o2, I-m1 or I-m2, wherein $Y^p$, $Y^o$ and $Y^m$ are oxygen, $R^{1p}$ together with $R^{2p}$, $R^{1o}$ together with $R^{2o}$ and $R^{1m}$ together with $R^{2m}$ represent one of subformulae III, IV or V and $R^{2p}$ together with $R^{1p}$, $R^{2o}$ together with $R^{1o}$ and $R^{2m}$ together with $R^{1m}$ represent one of subformulae III, IV or V.

In some embodiments, benzofuranones are of formula I-p1, I-p2, I-o1 or I-o2, wherein $Y^p$ and $Y^o$ are oxygen, $R^{1p}$ together with $R^{2p}$ and $R^{1o}$ together with $R^{2o}$ represent one of subformulae III, IV or V and $R^{2p}$ together with $R^{1p}$ and $R^{2o}$ together with $R^{1o}$ represent one of subformulae III, IV or V. In certain embodiments, benzofuranones are of formula I-p1 or I-p2, wherein Yp is oxygen and $R^{1p}$ together with $R^{2p}$ represent one of subformulae III, IV or V. In some embodiments, benzofuranones are of formula I-p, wherein Yp is oxygen and $R^{1p}$ together with $R^{2p}$ represent subformula IV.

The above cited embodiments for compounds of formula I-p1, I-p2, I-o1, I-o2, I-m1 or I-m2 refer individually to the structural units of formula I-p1, I-p2, I-o1, I-o2, I-m1 or I-m2. These structural units comprise the benzofuran-2-one unit including $R^4$, $R^5$, $R^6$ and $R^7$, the linking phenylene unit including $R^{p2}$, $R^{p3}$, $R^{p5}$, $R^{p6}$, $R^{o1}$, $R^{o2}$, $R^{o5}$, $R^{o6}$, $R^{m1}$, $R^{m3}$, $R^{m5}$ and $R^{m6}$ and the other-close-to-phosphorus atom unit including $R^{1p}$, $R^{2p}$, $R^{1o}$, $R^{2o}$, $R^{1m}$ and $R^{2m}$ with substituents for subformulae III, IV or V, i.e. $R^{a1}$, $R^{a1}$, $R^{a3}$, $R^{a4}$, $R^{b1}$, $R^{b2}$, $R^{b3}$, $R^{b4}$, $R^{b5}$, $R^{b6}$, $R^{c1}$, $R^{c2}$, $R^{c3}$ and $R^{c4}$. The above cited embodiments for the three structural units can be combined. Examples thereof are provided below.

In some embodiments, benzofuranones are formula I-p1, I-p2, I-o1, I-o2, I-m1 or I-m2, wherein $Y^p$, $Y^o$ and $Y^m$ are oxygen or represent a covalent bond; when $Y^p$, $Y^o$ and $Y^m$ are oxygen, $R^{1p}$ represents one of subformulae II-p, II-o or II-m, $R^{1o}$ represents one of subformulae II-o or II-m, $R^{1m}$ represents subformula II-m, or $R^{1p}$ together with $R^{2p}$, $R^{1o}$ together with $R^{2o}$ and $R^{1m}$ together with $R^{2m}$ represent one of subformulae III, IV or V, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-Cis-alkenyl, $C_2$-$C_{30}$-alkyl, which is interrupted by one or more oxygen atoms, or $C_2$-$C_{16}$-alkyl, which is interrupted by one sulfur atom, $R^{2p}$ represents one of subformulae II-p, II-o or II-m, $R^{2o}$ represents one of subformulae II-o or II-m, $R^{2m}$ represents subformula II-m, or $R^{2p}$ together with $R^{1p}$, $R^{2o}$ together with $R^{1o}$ and $R^{2m}$ together with $R^{1m}$ represent one of subformulae III, IV or V, or $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom; when $Y^p$, $Y^o$ and $Y^m$ represent a covalent bond, $R^{1p}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, or halogen; $R^4$ and $R^6$ are hydrogen, $R^5$ and $R^7$ are each independently hydrogen or $C_1$-$C_8$-alkyl, $R^{p2}$ and $R^{p6}$ are each independently hydrogen or $C_1$-alkyl, $R^{p3}$ and $R^{p5}$ are each independently hydrogen or $C_1$-$C_4$-alkyl, $R^{o1}$ and $R^{o6}$ are each independently hydrogen or $C_1$-$C_8$-alkyl, $R^{p2}$ is hydrogen or $C_1$-alkyl, $R^{o5}$ is hydrogen or $C_1$-$C_4$-alkyl, $R^{m1}$ is hydrogen or $C_1$-alkyl, $R^{m3}$ and $R^{m5}$ are each independently hydrogen or $C_1$-$C_4$-alkyl, $R^{m6}$ is hydrogen or $C_1$-$C_8$-alkyl, $R^{a1}$, $R^{a2}$, $R^{a3}$ and $R^{a4}$ are each independently hydrogen or $C_1$-$C_4$-alkyl, $R^{b1}$, $R^{b2}$, $R^{b3}$, $R^{b4}$, $R^{b5}$ and $R^{b6}$ are each independently hydrogen or $C_1$-$C_4$-alkyl and $R^{c1}$, $R^{c2}$, $R^{c3}$ and $R^{c4}$ are each independently hydrogen or $C_1$-$C_4$-alkyl.

In some embodiments, benzofuranones are of formula I-p1, I-p2, I-o1, I-o2, I-m1 or I-m2, wherein $Y^p$, $Y^o$ and $Y^m$ are oxygen or represent a covalent bond; when $Y^p$, $Y^o$ and $Y^m$ are oxygen, $R^{1p}$ represents one of subformulae II-p, II-o or II-m, $R^{1o}$ represents one of subformulae II-o or II-m, $R^{1m}$ represent subformula II-m, or $R^{1p}$ together with $R^{2p}$, $R^{1o}$ together with $R^{2o}$ and $R^{1m}$ together with $R^{2m}$ represent one of subformulae III, IV or V, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl, or $C_3$-$C_{16}$-cycloalkyl and $R^{2p}$ represents one of subformulae II-p, II-o or II-m, $R^{2o}$ represents one of subformulae II-o or II-m, $R^{2m}$ represents subformula II-m, or $R^{2p}$ together with $R^{1p}$, $R^{2o}$ together with $R^{1o}$ and $R^{2m}$ together with $R^{1m}$ represent one of subformulae III, IV or V, or $R^{2p}$, $R^{2o}$ and $R^{2m}$ are $C_6$-$C_{10}$-aryl, which is unsubstituted or substituted by $C_1$-$C_8$-alkyl, $C_1$-$C_{18}$-alkyl or $C_3$-$C_{16}$-cycloalkyl; when $Y^p$, $Y^o$ and $Y^m$ represent a covalent bond, $R^{1p}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_{18}$-alkyl or $C_3$-$C_{16}$-cycloalkyl and $R^{2p}$, $R^{2o}$ and $R^{2m}$ are $C_6$-$C_{10}$-aryl, which is unsubstituted or substituted by $C_1$-$C_8$-alkyl, or fluoro; $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl, $R^{o1}$, $R^{o2}$, $R^{o5}$ and $R^{o6}$ are each independently hydrogen or $C_1$-$C_8$-alkyl, $R^{m1}$, $R^{m3}$, $R^{m5}$ and $R^{m6}$ are each independently hydrogen or $C_1$-$C_8$-alkyl, $R^{a1}$, $R^{a2}$, $R^{a3}$ and $R^{a4}$ are each independently hydrogen or $C_1$-$C_8$-alkyl, $R^{b1}$, $R^{b2}$, $R^{b3}$, $R^{b4}$, $R^{b5}$ and $R^{b6}$ are each independently hydrogen or $C_1$-$C_8$-alkyl and $R^{c1}$, $R^{c2}$, $R^{c3}$ and $R^{c4}$ are each independently hydrogen or $C_1$-$C_8$-alkyl.

In certain embodiments, benzofuranones are of formula I-p1, I-p2, I-o1 or I-o2, wherein $Y^p$ and $Y^o$ are oxygen or represent a covalent bond; when $Y^p$ and $Y^o$ are oxygen, $R^{1p}$ represents one of subformulae II-p or 11-0, $R^{1o}$ represents subformulae II-o, or $R^{1p}$ together with $R^{2p}$ and $R^{1o}$ together with $R^{2o}$ represent one of subformulae III, IV or V, or $R^{1p}$ and $R^{1o}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$ represents one of subformulae II-p or 11-0, $R^{2o}$ represents subformulae II-o, or $R^{2p}$ together with $R^{1p}$ and $R^{2o}$ together with $R^{1o}$ represent one of subformulae III, IV or V, or $R^{2p}$ and $R^{2o}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom; when $Y^p$ and $Y^o$ represent a covalent bond, $R^{1p}$ represents one of subformulae II-p or 11-0, $R^{1o}$ represents subformula II-o, or $R^{1p}$ and $R^{1o}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$ and $R^{2o}$ are $C_6$-$C_{10}$-aryl, which is unsubstituted or substituted by $C_1$-$C_8$-alkyl, $C_1$-$C_6$-alkoxy, halogen or one phenyl, or halogen; $R^4$, $R^5$, $R^6$ and $R^7$ are each independently hydrogen or $C_1$-$C_6$-alkyl, $R^{p2}$, $R^{p3}$, $R^{p5}$ and $R^{p6}$ are each independently hydrogen or $C_1$-$C_8$-alkyl, $R^{o1}$, $R^{o2}$, $R^{o5}$, and $R^{o6}$ are each independently hydrogen or $C_1$-$C_8$-alkyl, $R^{a1}$, $R^{a2}$, $R^{a3}$ and $R^{a4}$ are each independently hydrogen or $C_1$-$C_8$-alkyl, $R^{b1}$, $R^{b2}$, $R^{b3}$, $R^{b4}$, $R^{b5}$ and $R^{b6}$ are each independently hydrogen or $C_1$-$C_8$-alkyl and $R^{c1}$, $R^{c2}$, $R^{c3}$ and $R^{c4}$ are each independently hydrogen or $C_1$-$C_8$-alkyl.

In some embodiments, benzofuranones are of formula I-p1, I-p2, I-o1 or I-o2, wherein $Y^p$ and $Y^o$ are oxygen or represent a covalent bond; when $Y^p$ and $Y^o$ are oxygen, $R^{1p}$ represents one of subformulae II-p or 11-0, $R^{1o}$ represents subformula II-o, or $R^{1p}$ together with $R^{2p}$ and $R^{1o}$ together with $R^{2o}$ represent subformula III, or $R^{1p}$ and $R^{1o}$ are $C_6$-$C_{10}$-aryl, which is unsubstituted by $C_1$-$C_8$-alkyl, or $C_1$-$C_{18}$-alkyl, $R^{2p}$ represents one of subformulae II-p or II-o, $R^{2o}$ represents subformula II-o, or $R^{2p}$ together with $R^{1p}$ and $R^{2o}$ together with $R^{1o}$ represent subformula III, or $R^{2p}$ and $R^{2o}$ are $C_6$-$C_{10}$-aryl, which is unsubstituted or substituted by $C_1$-$C_8$-alkyl, or $C_1$-$C_{18}$-alkyl; when $Y^p$ and $Y^o$ represent a covalent bond, $R^{1p}$ represents one of subformulae II-p or 11-0, $R^{1o}$ represents subformula II-o, or $R^{1p}$ and $R^{1o}$ are $C_6$-$C_{10}$-aryl, which is unsubstituted or substituted by $C_1$-$C_8$-alkyl, or $C_1$-$C_{18}$-alkyl, $R^{2p}$ and $R^{2o}$ are $C_6$-$C_{10}$-aryl, which is unsubstituted or substituted by $C_1$-$C_8$-alkyl, or fluoro; $R^4$ and $R^6$ are hydrogen, $R^5$ and $R^7$ are each independently hydrogen or $C_1$-$C_8$-alkyl, $R^{p2}$ and $R^{p6}$ are hydrogen, $R^{p3}$ and $R^{p5}$ are each independently hydrogen or $C_1$-$C_4$-alkyl, wherein one of $R^{p3}$ and $R^{p5}$ is not $C_a$-alkyl, $R^{o1}$ is hydrogen or $C_1$-$C_8$-alkyl, $R^{o2}$ is hydrogen, $R^{o5}$ is hydrogen or $C_1$-$C_3$-alkyl, $R^{o6}$ is hydrogen or $C_1$-$C_4$-alkyl, $R^{a1}$, Rae, $R^{a3}$ and $R^{a4}$ are each independently hydrogen or $C_1$-$C_4$-alkyl, $R^{b1}$, $R^{b2}$, $R^{b3}$, $R^{b4}$, $R^{b5}$ and $R^{a6}$ are each independently hydrogen or $C_1$-$C_4$-alkyl and $R^{c1}$, $R^{c2}$, $R^{c3}$ and $R^{c4}$ are each independently hydrogen or $C_1$-$C_4$-alkyl.

In other embodiments, benzofuranones are of formula I-p1, I-p2, I-o1, I-o2, I-m1 or I-m2, wherein $Y^p$, $Y^o$ and $Y^m$ are oxygen or represent a covalent bond; when $Y^p$, $Y^o$ and $Y^m$ are oxygen, $R^{1p}$ represents one of subformulae II-p, II-o or II-m $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$ represents one of subformulae II-p, II-o or II-m, $R^{2o}$ represents one of subformulae II-o or II-m, $R^{2m}$ represents subformula II-m, or $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom; when $Y^p$, $Y^o$ and $Y^m$ represent a covalent bond, $R^{1p}$ represents one of subformulae II-p, II-o or II-m, $R^{1o}$ represents one of subformulae II-o or II-m, $R^{1m}$ represents subformula II-m, or $R^{1p}$, $R^{1o}$ and $R^{1m}$ are $C_6$-$C_{10}$-aryl, which is unsubstituted or substituted by $C_1$-$C_8$-alkyl, $C_1$-$C_8$-alkoxy, halogen or one phenyl, $C_1$-$C_{18}$-alkyl, $C_3$-$C_{16}$-cycloalkyl, $C_7$-$C_{13}$-aralkyl, $C_2$-$C_{18}$-alkenyl, $C_2$-$C_{30}$-alkyl, which is interrupted by one or more oxygen atoms, or $C_2$-$C_{16}$-alkyl, which is interrupted by one sulfur atom, $R^{2p}$, $R^{2o}$ and $R^{2m}$ are $C_6$-$C_{10}$-aryl, which is unsubstituted or substituted by $C_1$-$C_8$-alkyl, $C_1$-$C_8$-alkoxy, halogen or one phenyl, or halogen; $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl, $R^{o1}$, $R^{o2}$, $R^{o5}$ and $R^{o6}$ are each independently hydrogen or $C_1$-$C_8$-alkyl and $R^{m1}$, $R^{m3}$, $R^{m5}$ and $R^{m6}$ are each independently hydrogen or $C_1$-$C_8$-alkyl.

In some embodiments, benzofuranones are of formula I-p1, I-p2, I-o1, I-o2, I-m1 or I-m2, wherein $Y^p$, $Y^o$ and $Y^m$ are oxygen, $R^{1p}$ together with $R^{2p}$, $R^{1o}$ together with $R^{2o}$ and $R^{1m}$ together with $R^{2m}$ represent one of subformulae III, IV or V, $R^{2p}$ together with $R^{1p}$, $R^{2o}$ together with $R^{1o}$ and $R^{2m}$ together with $R^{1m}$ represent one of subformulae III, IV or V, $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl, $R^{o1}$, $R^{o2}$, $R^{o5}$ and $R^{o6}$ are each independently hydrogen or $C_1$-$C_8$-alkyl, $R^{m1}$, $R^{m3}$, $R^{m5}$ and $R^{m6}$ are each independently hydrogen or $C_1$-$C_8$-alkyl, $R^{a1}$, $R^{a2}$, $R^{a3}$ and $R^{a4}$ are each independently hydrogen or $C_1$-$C_8$-alkyl, $R^{b1}$, $R^{b2}$, $R^{b3}$, $R^{b4}$, $R^{b5}$ and $R^{b6}$ are each independently hydrogen or $C_1$-$C_8$-alkyl and $R^{c1}$, $R^{c2}$, $R^{c3}$ and $R^{c4}$ are each independently hydrogen or $C_1$-$C_8$-alkyl.

In certain embodiments, benzofuranones are of formula I-p1, I-p2, I-o1 or I-o2, wherein $Y^p$ and $Y^o$ are oxygen, $R^{1p}$ together with $R^{2p}$ and $R^{1o}$ together with $R^{2o}$ represent one of subformulae III, IV or V, $R^{2p}$ together with $R^{1p}$ and $R^{2o}$ together with $R^{1o}$ represent one of subformulae III, IV or V, $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl, $R^{o1}$, $R^{o2}$, $R^{o5}$ and $R^{o6}$ are each independently hydrogen or $C_1$-$C_8$-alkyl, $R^{a1}$, $R^{a2}$, $R^{a3}$ and $R^{a4}$ are each independently hydrogen or $C_1$-$C_8$-alkyl, $R^{b1}$, $R^{b2}$, $R^{b3}$, $R^{b4}$, $R^{b5}$ and $R^{b6}$ are each independently hydrogen or $C_1$-$C_8$-alkyl and $R^{c1}$, $R^{c2}$, $R^{c3}$ and $R^{c4}$ are each independently hydrogen or $C_1$-$C_8$-alkyl.

In some embodiments, benzofuranones are of formula I-p1 or I-p2, wherein $Y^p$ is oxygen, $R^{1p}$ together with $R^{2p}$ represent one of subformulae III, IV or V, $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl, $R^{a1}$, $R^{a2}$, $R^{a3}$ and $R^{a4}$ are each independently hydrogen or $C_1$-$C_8$-alkyl, $R^{b1}$, $R^{b2}$, $R^{b3}$, $R^{b4}$, $R^{b5}$ and $R^{b6}$ are each independently hydrogen or $C_1$-$C_8$-alkyl and $R^{c1}$, $R^{c2}$, $R^{c3}$ and $R^{c4}$ are each independently hydrogen or $C_1$-$C_8$-alkyl.

In some embodiments in benzofuranone compounds of formula I-p1 or I-p2, $Y^p$ is oxygen, $R^{1p}$ together with $R^{2p}$ represent subformula IV, $R^4$, $R^5$, $R^6$ and $R^7$ are each independently hydrogen or $C_1$-$C_8$-alkyl, $R^{p2}$, $R^{p3}$, $R^{p5}$ and $R^{p6}$ are each independently hydrogen or $C_1$-$C_8$-alkyl and $R^{b1}$, $R^{b2}$, $R^{b3}$, $R^{b4}$, $R^{b5}$ and $R^{b6}$ are each independently hydrogen or $C_1$-$C_8$-alkyl.

In some embodiments, benzofuranones are selected from compounds of formula (101)-(133).

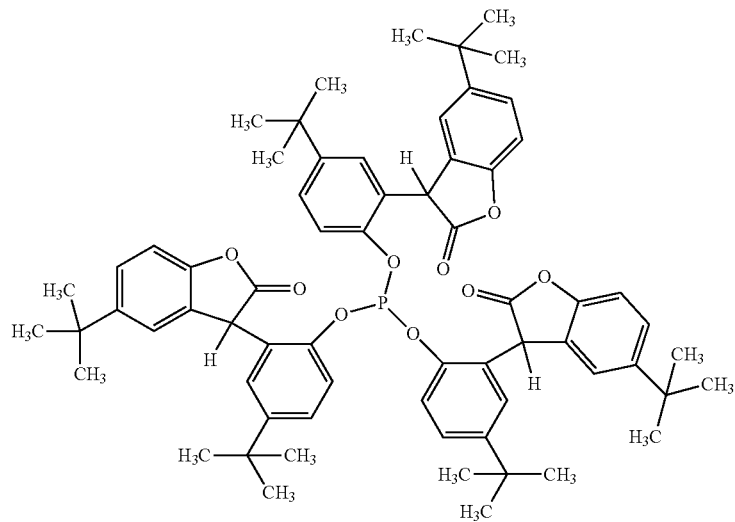

101

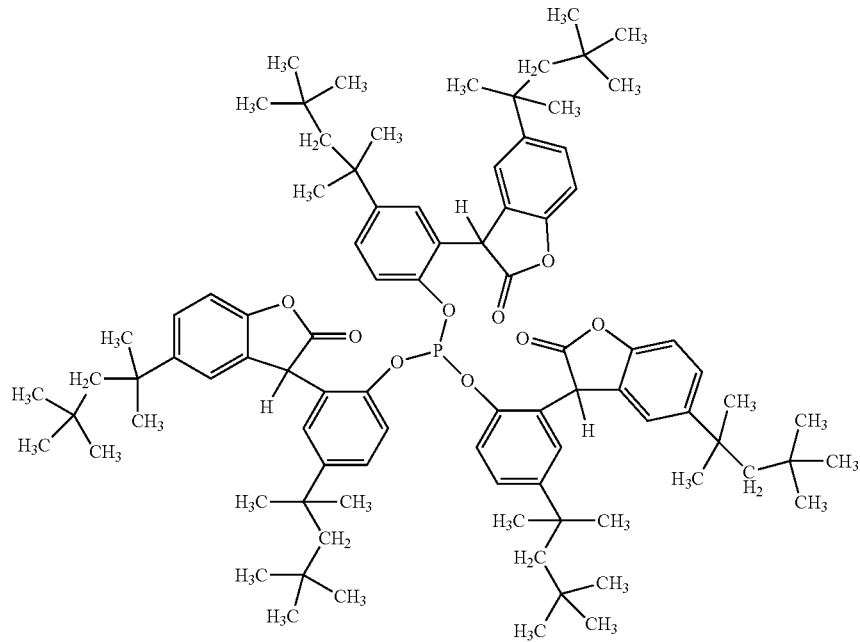

102

-continued
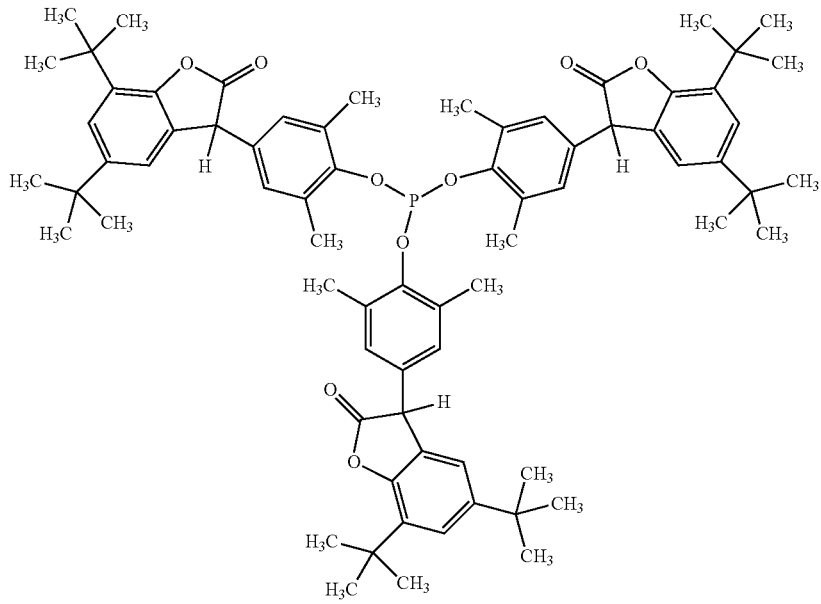
103
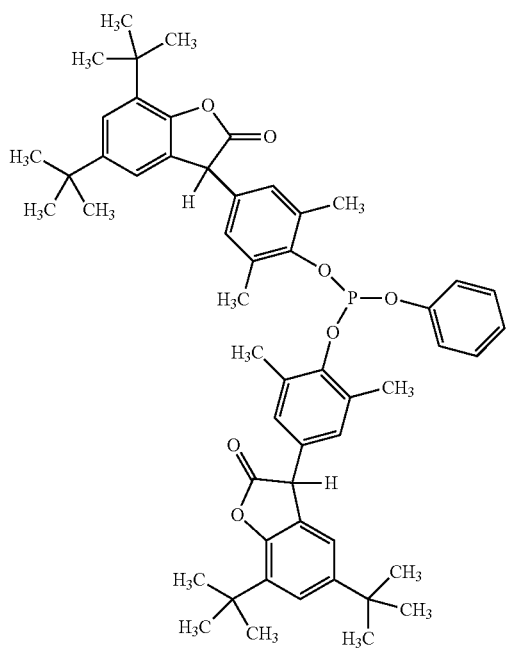
104
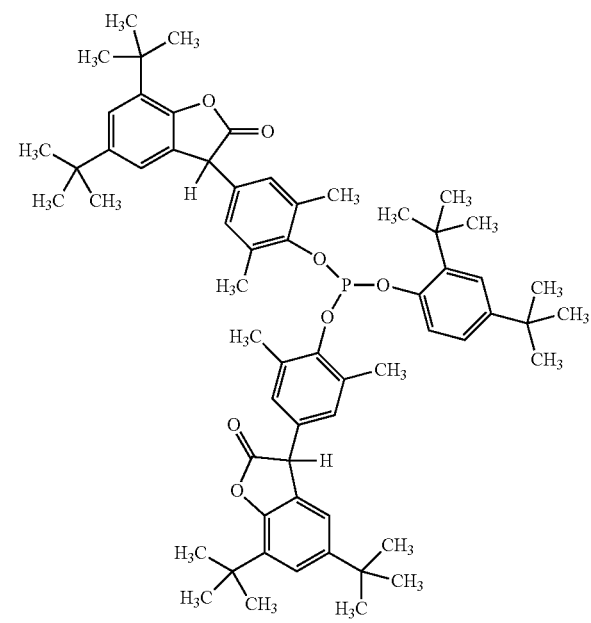
105
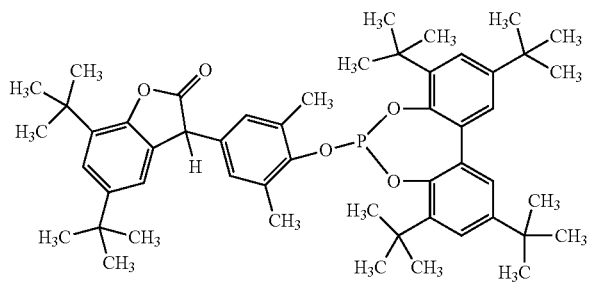
106
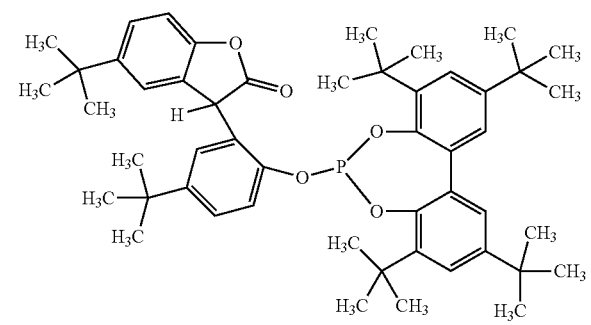
107

-continued
108
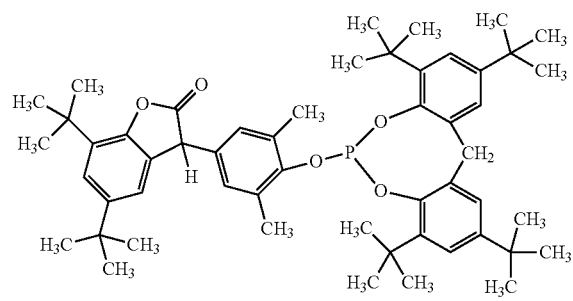
109
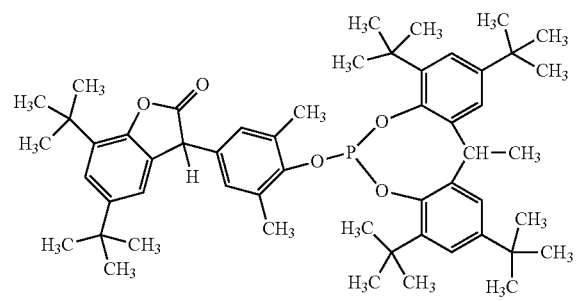
110
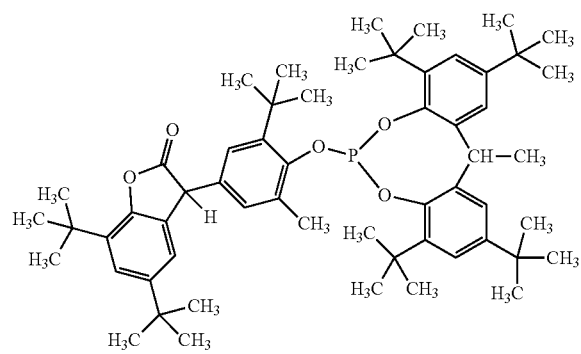
111
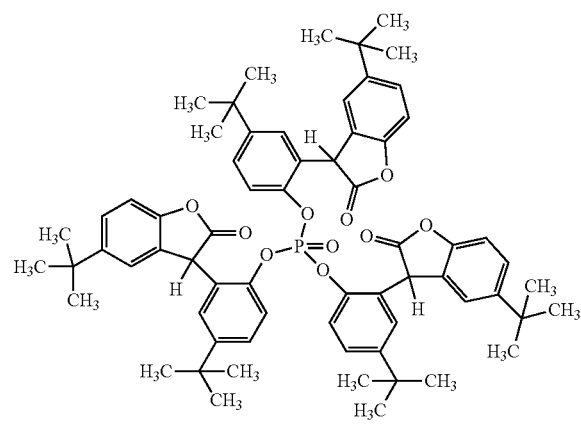
112
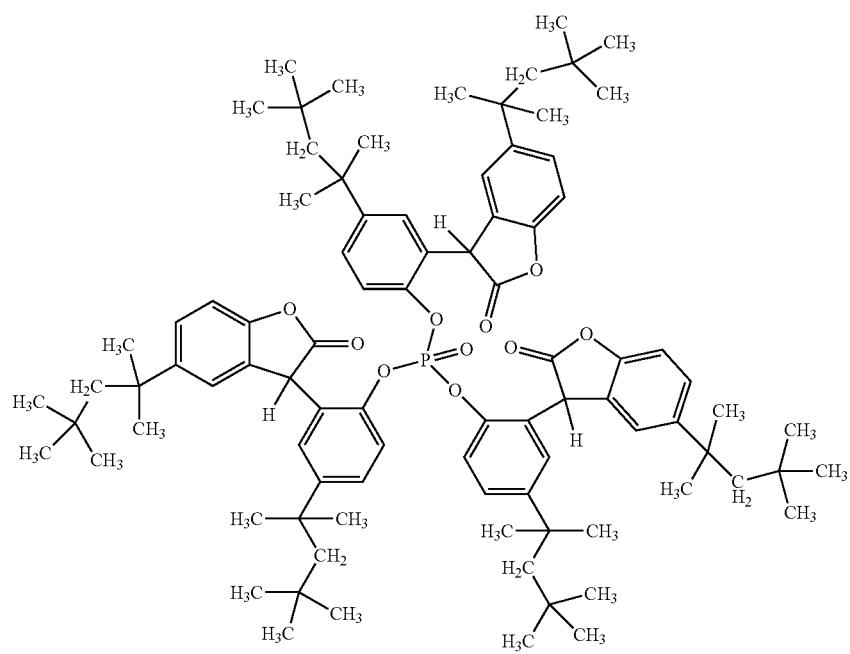

-continued
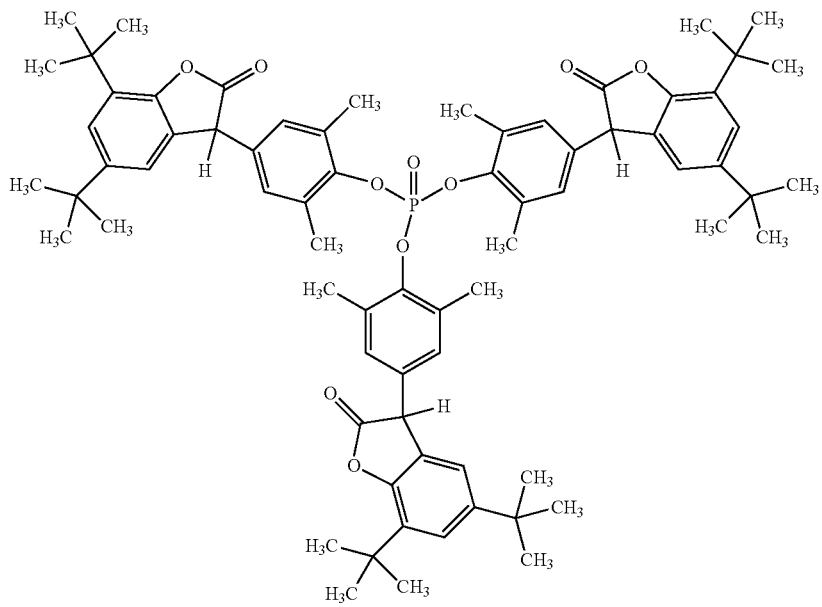
113
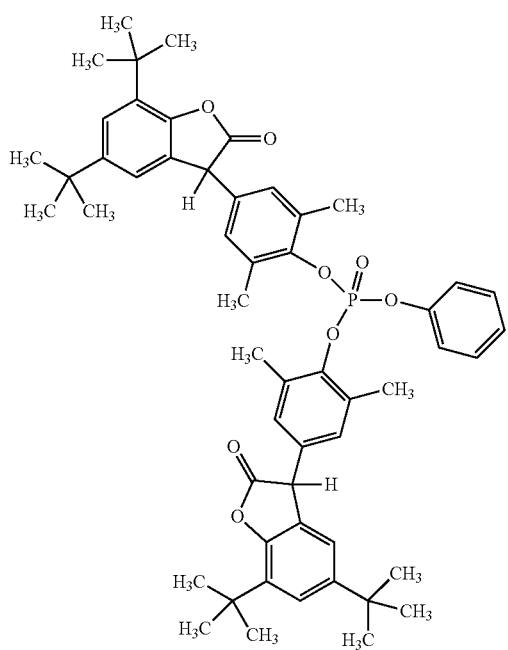
114
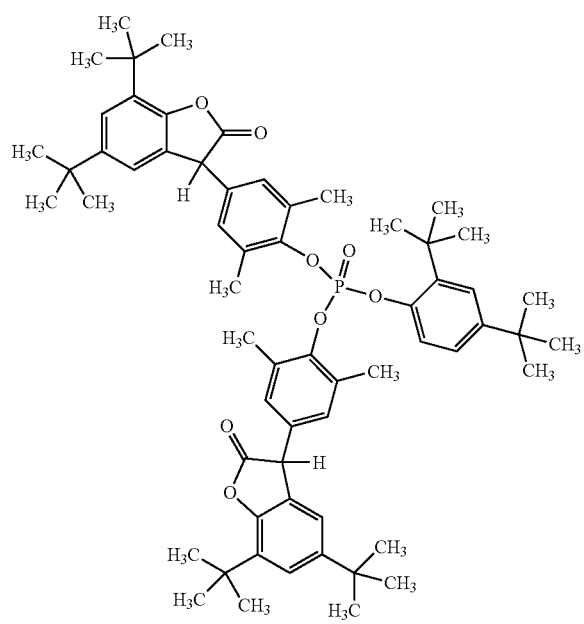
115
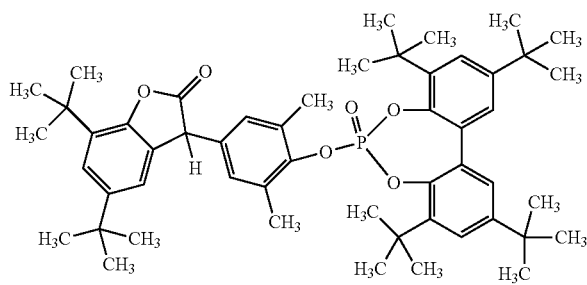
116
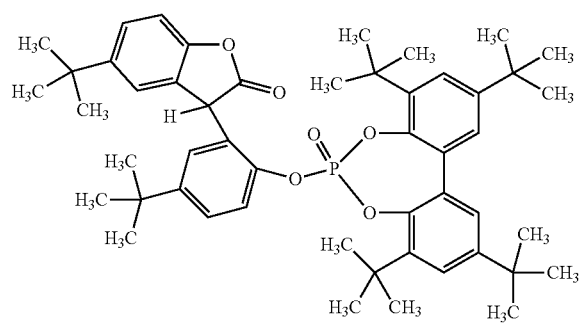
117

-continued
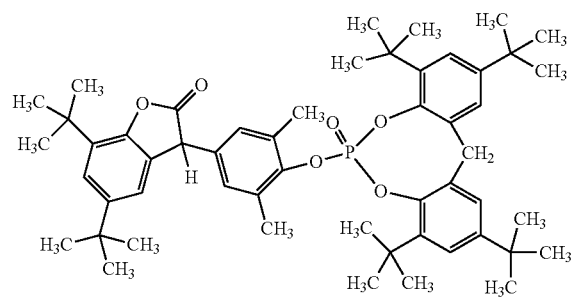
118
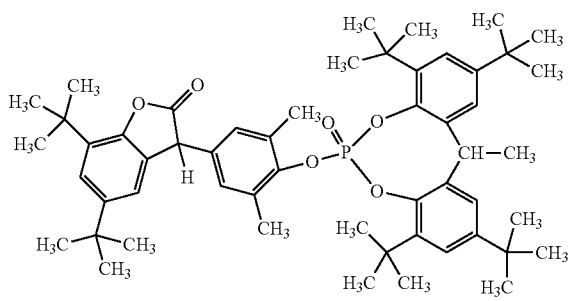
119
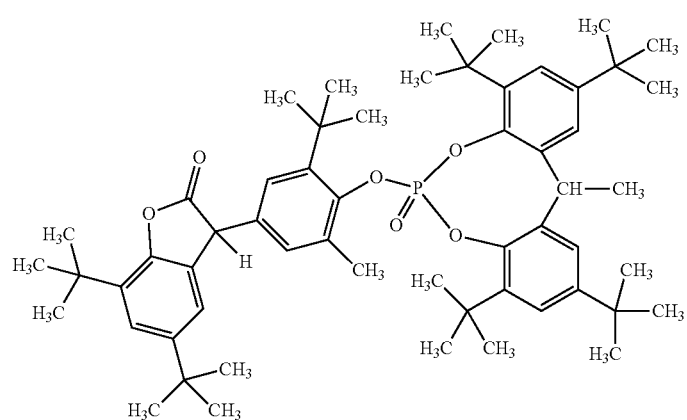
120
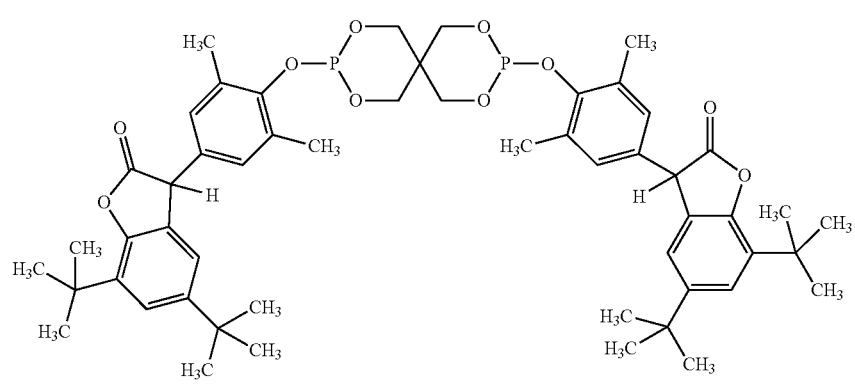
121
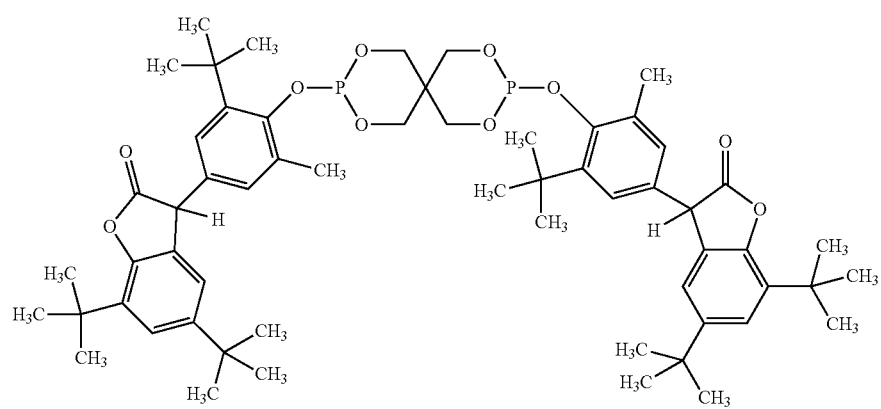
122

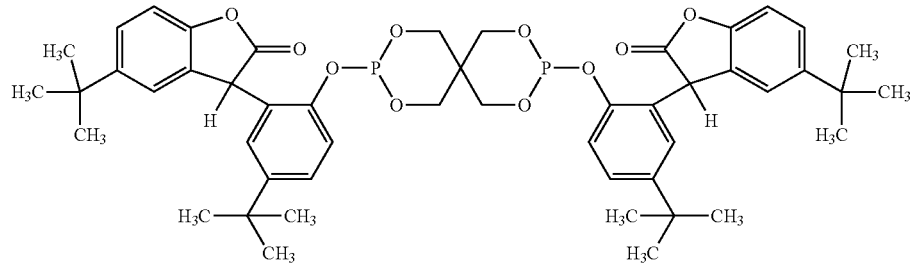
123
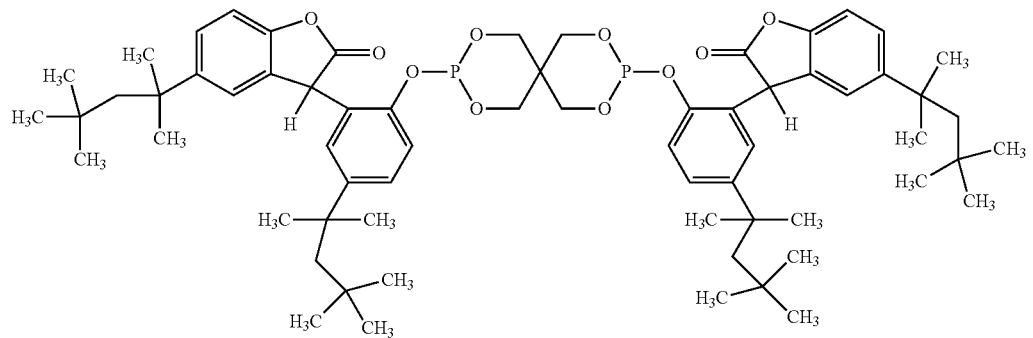
124
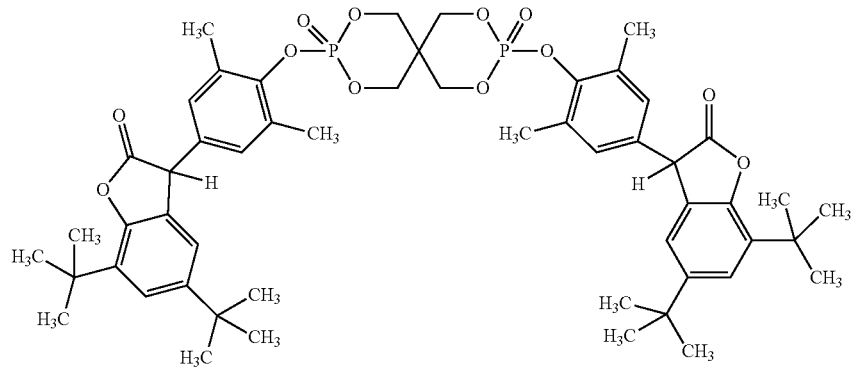
125
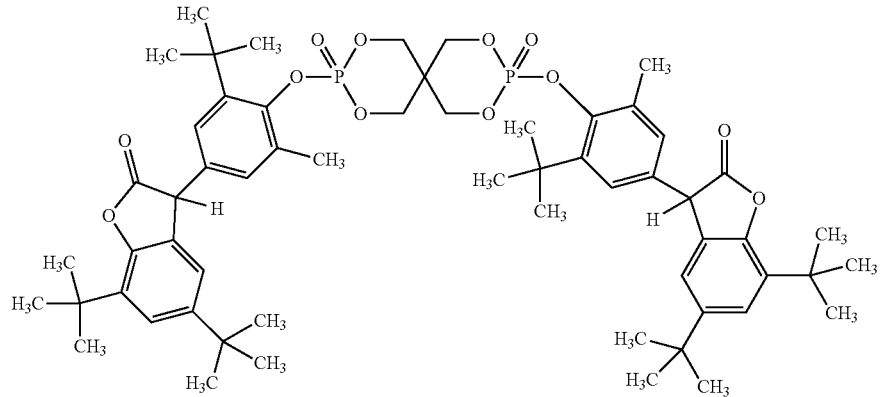
126

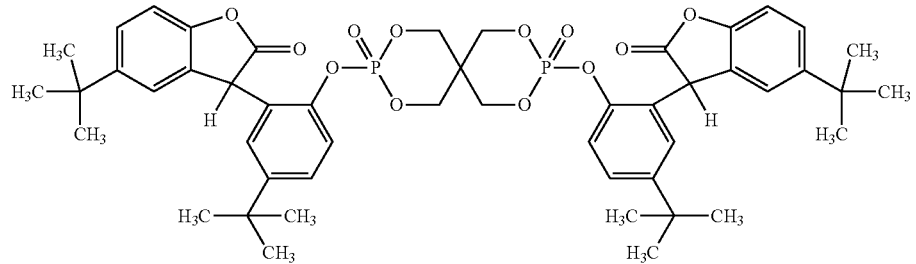
127
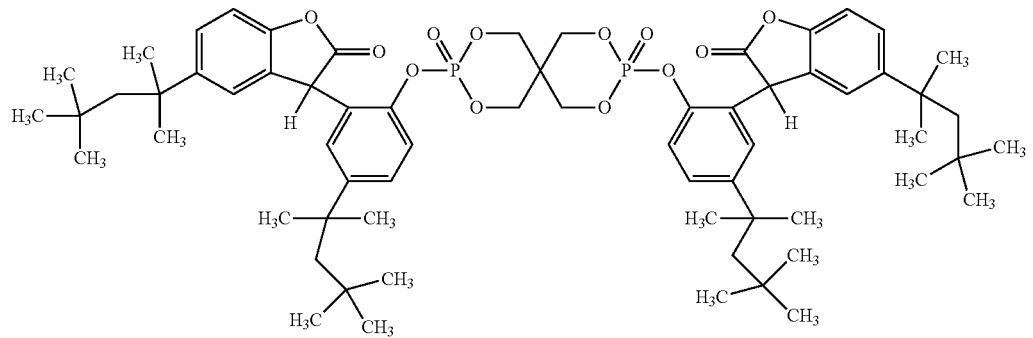
128
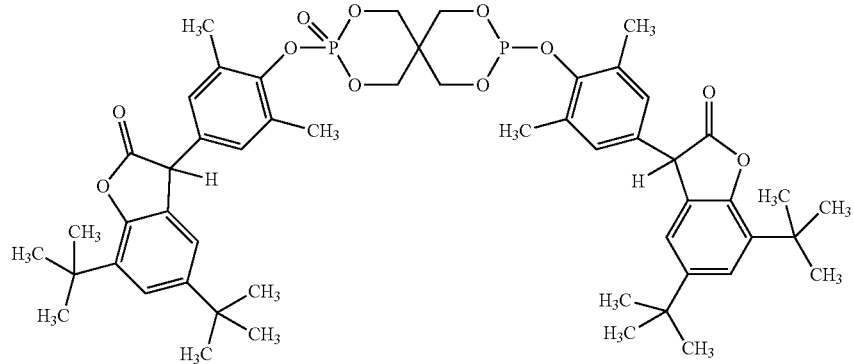
129
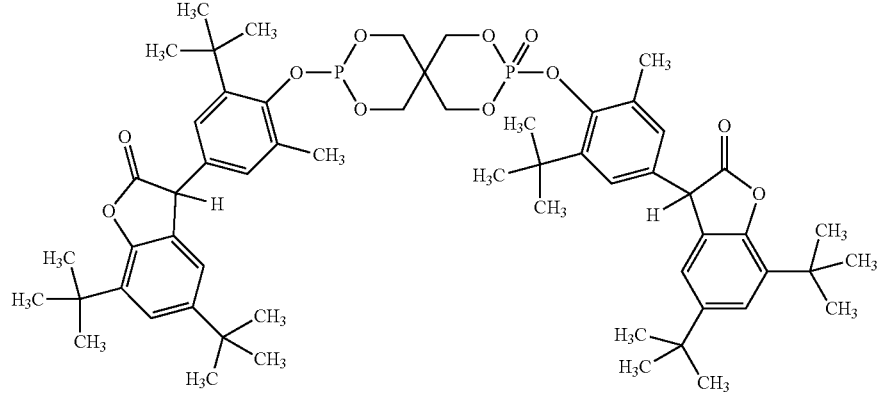
130

-continued

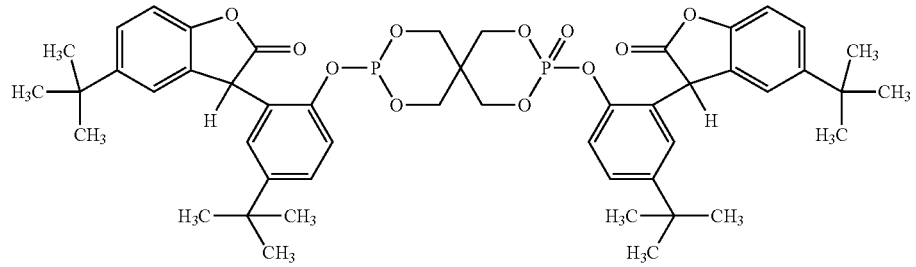

131

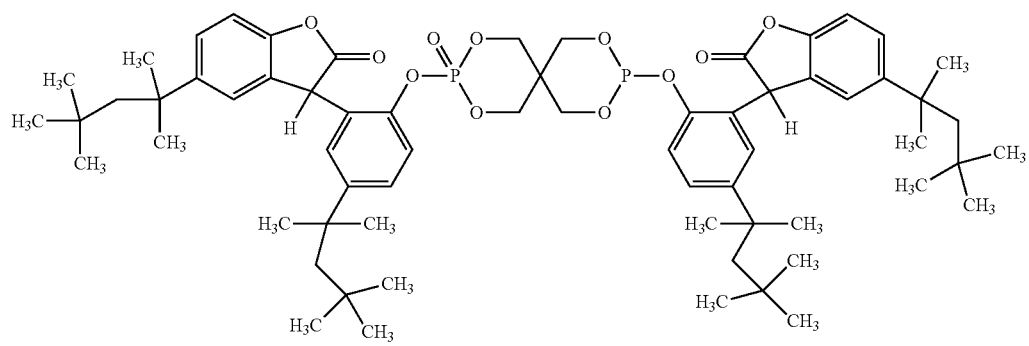

132

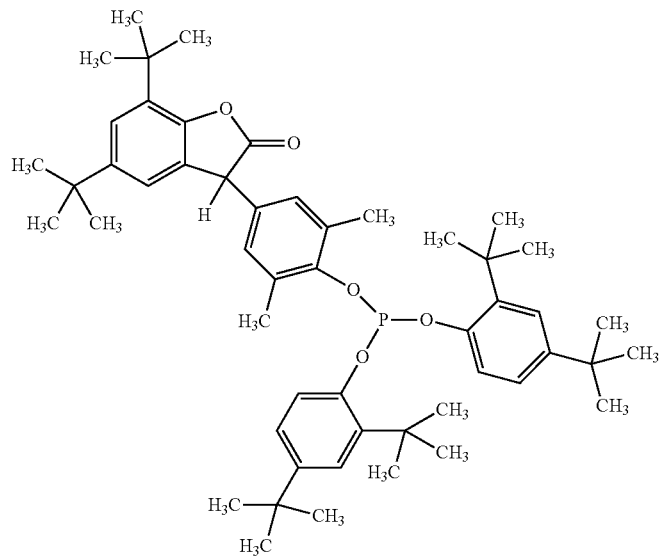

133

The present benzofuranones may be prepared as disclosed in US2017/0226323, US2017/0066905 and U.S. application Ser. No. 15/751,497, published as WO2017/025431.

Hindered amine light stabilizers (HALS) are disclosed for example in U.S. application Ser. No. 14/379,842, published as WO2013/136285 and U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456.

Hindered amine light stabilizers are, in some embodiments, compounds containing one or more moieties of formula

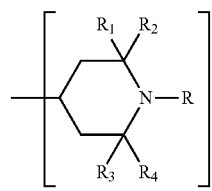

wherein $R_1$, $R_2$, $R_3$ and $R_4$ are independently methyl or ethyl and wherein R is H, methyl, hydroxy, propoxy, octyloxy, cyclohexyloxy, acyloxy or N-(2-hydroxy-2-methyl-propoxy).

Suitable hindered amine light stabilizers are for example:
(1) 1-cyclohexyloxy-2,2,6,6-tetramethyl-4-octadecylaminopiperidine,
(2) bis(2,2,6,6-tetramethylpiperidin-4-yl) sebacate,
(3) bis(1-acetoxy-2,2,6,6-tetramethylpiperidin-4-yl) sebacate,
(4) bis(1,2,2,6,6-pentamethylpiperidin-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate;
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate
(9) 2,4-bis[(1-cyclohexyloxy-2,2,6,6-tetramethylpiperidin-4-yl)butylamino]-6-(2-hydroxyethyl amino-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl)butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 2,2,6,6-tetramethylpiperidin-4-yl octadecanoate,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxo-spiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl)pyrrolidine-2,5-dione,
(33) N,N'-bis-formyl-N,N'-bis(2,2,6,6-tetramethyl-4-piperidyl)hexamethylenediamine,
(33a) bis(1-undecanyloxy-2,2,6,6-tetramethylpiperidin-4-yl)carbonate,
(34) reaction product of 2,4-bis[(1-cyclohexyloxy-2,2,6,6-piperidin-4-yl)butylamino]-6-chloro-5-triazine with N,N'-bis(3-aminopropyl)ethylenediamine),
(35) condensate of 1-(2-hydroxyethyl)-2,2,6,6-tetramethyl-4-hydroxypiperidine and succinic acid,
(36) condensate of N,N'-bis(2,2,6,6-tetramethyl-4-piperidyl)-hexamethylenediamine and 4-tert-octylamino-2,6-dichloro-1,3,5-triazine,
(37) condensate of N,N'-bis(2,2,6,6-tetramethyl-4-piperidyl)-hexamethylenediamine and 4-cyclohexylamino-2,6-dichloro-1,3,5-triazine,
(38) condensate of N,N'-bis-(2,2,6,6-tetramethyl-4-piperidyl)hexamethylenediamine and 4-morpholino-2,6-dichloro-1,3,5-triazine,
(39) condensate of N,N'-bis-(1,2,2,6,6-pentamethyl-4-piperidyl)hexamethylenediamine and 4-morpholino-2,6-dichloro-1,3,5-triazine,
(40) condensate of 2-chloro-4,6-bis(4-n-butylamino-2,2,6,6-tetramethylpiperidyl)-1,3,5-triazine and 1,2-bis(3-aminopropylamino)ethane,
(41) condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro [4,5]decane and epichlorohydrin,
(43) poly[methyl,(3-oxy-(2,2,6,6-tetramethylpiperidin-4-yl)propyl)] siloxane, CAS #182635-99-0,
(44) reaction product of maleic acid anhydride-$C_{18}$-$C_{22}$-α-olefin-copolymer with 2,2,6,6-tetramethyl-4-aminopiperidine,
(45) oligomeric condensate of 4,4'-hexamethylenebis (amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
(46) oligomeric condensate of 4,4'-hexamethylenebis (amino-1,2,2,6,6-pentaamethyl-piperidine) and 2,4-dichloro-6-[(1,2,2,6,6-pentaamethylpiperidin-4-yl)butylamino]-s-triazine end-capped with 2-chloro-4,6-bis(dibutylamino)-s-triazine,
(47) oligomeric condensate of 4,4'-hexamethylenebis (amino-1-propoxy-2,2,6,6-tetramethyl piperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
(48) oligomeric condensate of 4,4'-hexamethylenebis (amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine,
(49) product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine,
(50) (4-piperidinol, 2,2,6,6-tetramethyl-1-(undecyloxy))-, 4,4'-carbonate and
(51) 1,3,5-triazine-2,4,6-triamine, N2,N2'-1,6-hexanediylbis [N4,N6-dibutyl-N2,N4,N6-tris(2,2,6,6-tetramethyl-4-piperidinyl)-, N-propoxy.

Also included are the sterically hindered N—H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds. For example, replacing an N—H hindered amine with an N-methyl hindered amine would be employing the N-methyl analogue in place of the N—H.

For illustrative purposes, some of the structures for the above-named compounds are shown below.

(6) 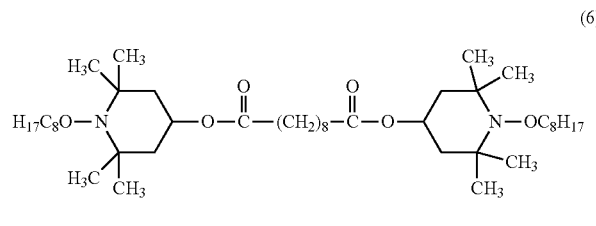
(8) 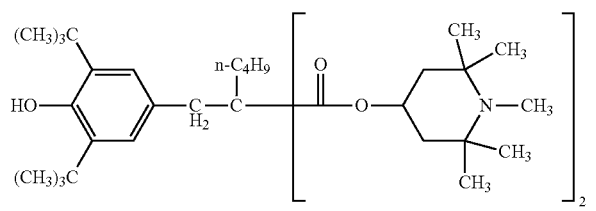
(9) 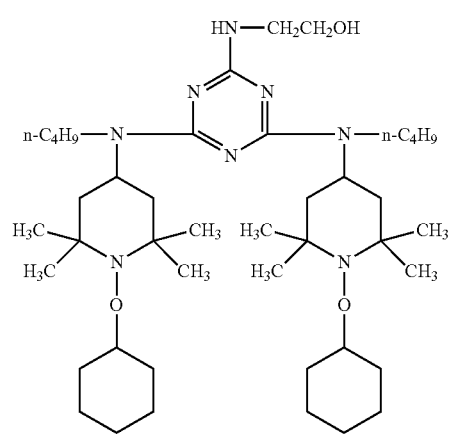
(12) 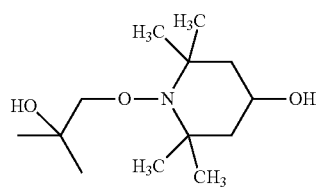
(19) 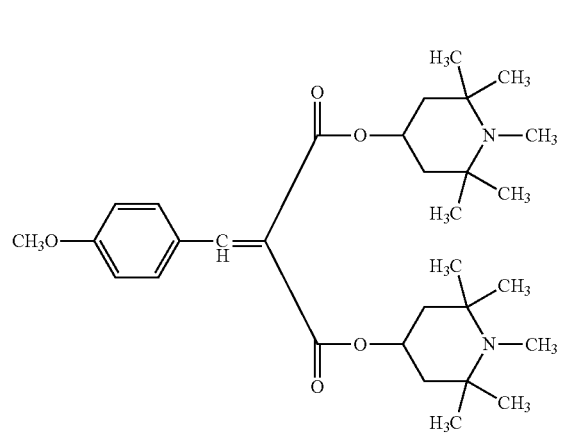
(23) 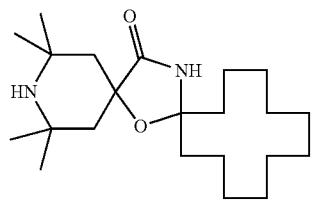
(25) 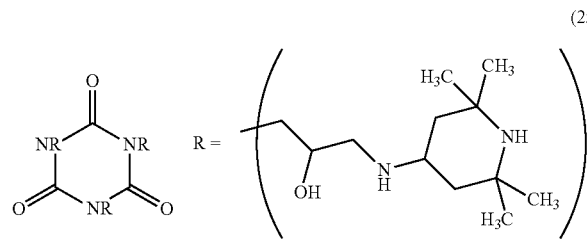
(26) 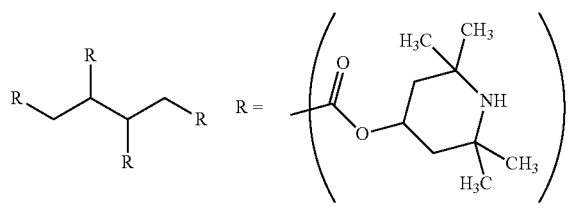
(28) 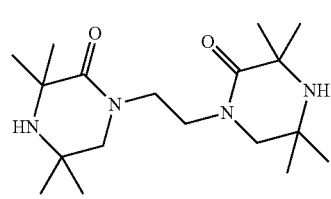
(29) 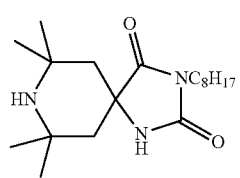

-continued
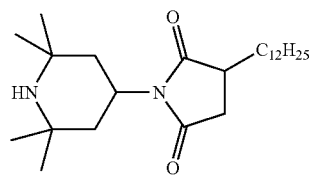
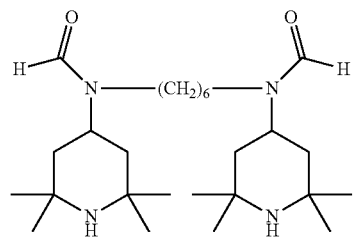
(31)
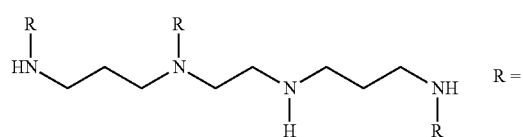
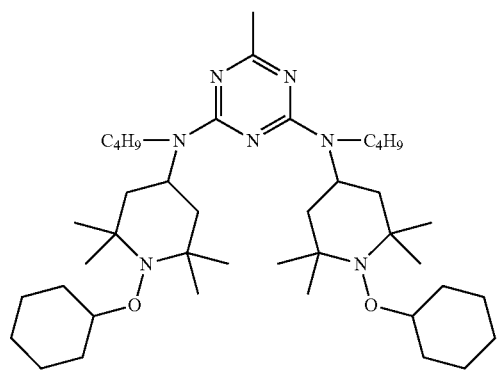
(34)
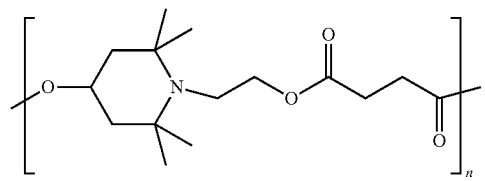
(35)
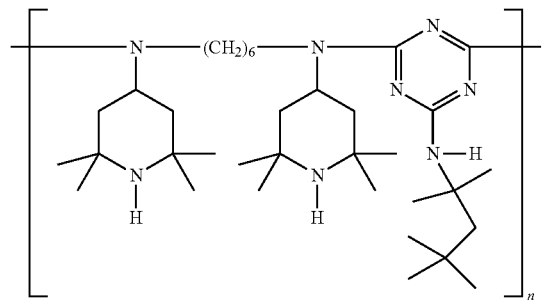
(36)
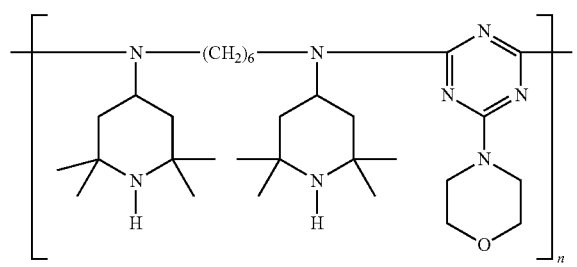
(38)

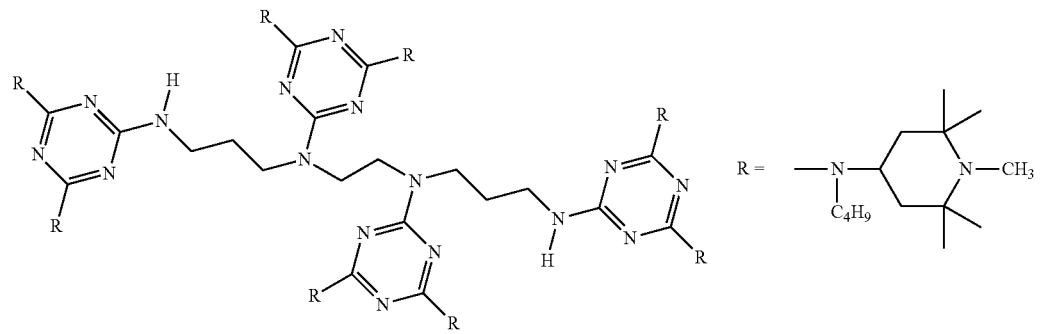
(41)
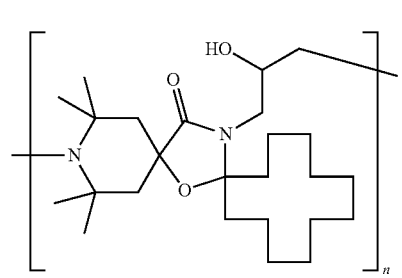
(42)
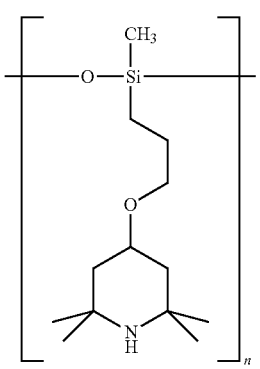
(43)
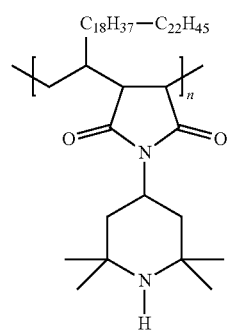
(44)
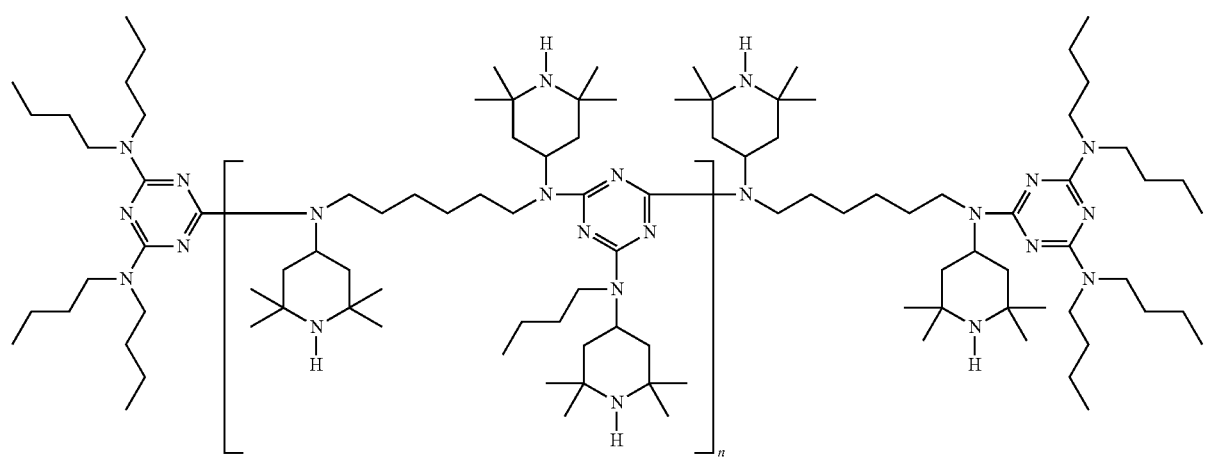
(45)

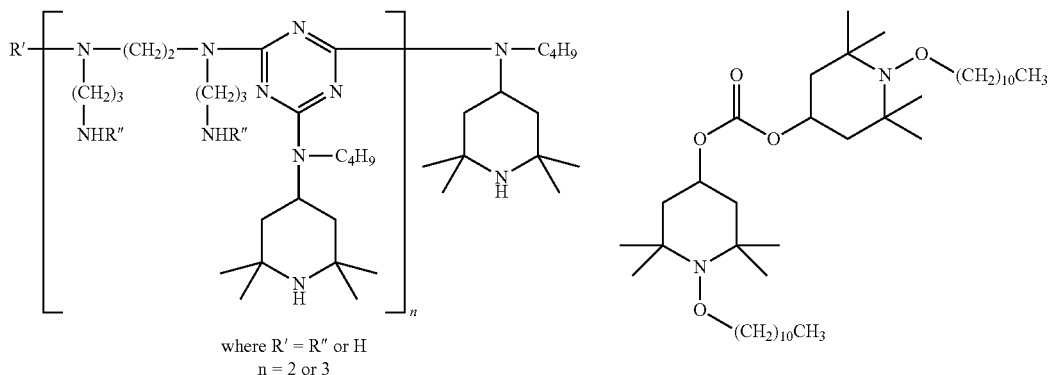

(49)

where R' = R" or H
n = 2 or 3 and where R" =

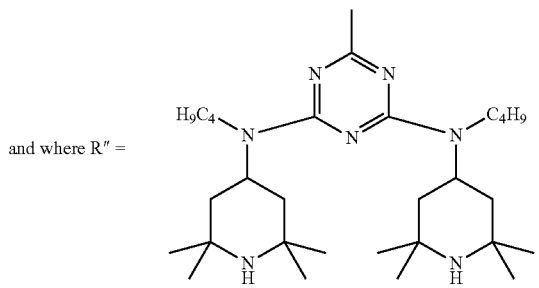

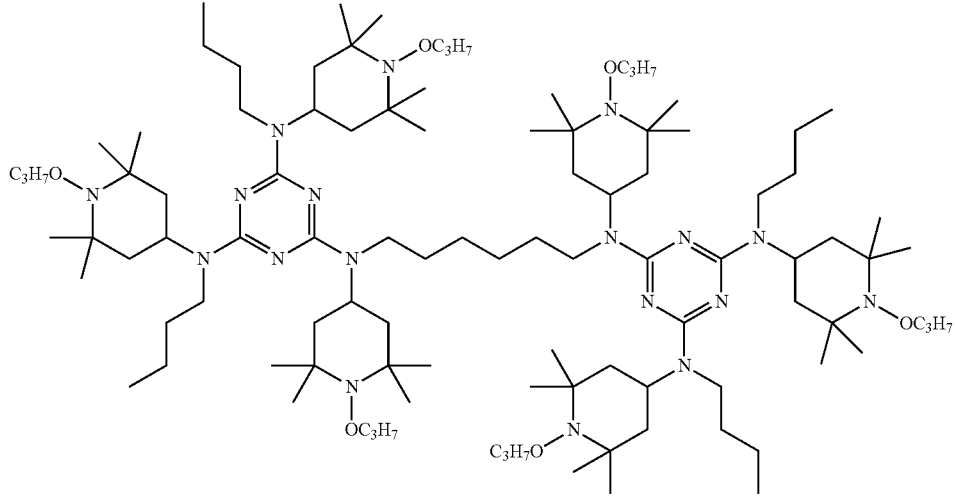

(50)

(51)

In certain embodiments, the hindered amine light stabilizers are selected from the group consisting of (2) bis(2,2,6,6-tetramethylpiperidin-4-yl) sebacate,

(20) 2,2,6,6-tetramethylpiperidin-4-yl octadecanoate,

(14) 1-(2-hydroxy-2-methylpropoxy)-4-octadecanoyloxy-2,2,6,6-tetramethylpiperidine,

(33) N,N'-bis-formyl-N,N'-bis(2,2,6,6-tetramethyl-4-piperidyl)hexamethylenediamine,

(34) reaction product of 2,4-bis[(1-cyclohexyloxy-2,2,6,6-piperidin-4-yl)butylamino]-6-chloro-5-triazine with N,N'-bis(3-aminopropyl)ethylenediamine),

(35) condensate of 1-(2-hydroxyethyl)-2,2,6,6-tetramethyl-4-hydroxypiperidine and succinic acid,

(36) condensate of N,N'-bis(2,2,6,6-tetramethyl-4-piperidyl)-hexamethylenediamine and 4-tert-octylamino-2,6-dichloro-1,3,5-triazine,

(38) condensate of N,N'-bis-(2,2,6,6-tetramethyl-4-piperidyl)hexamethylenediamine and 4-morpholino-2,6-dichloro-1,3,5-triazine,

(39) condensate of N,N'-bis-(1,2,2,6,6-pentamethyl-4-piperidyl)hexamethylenediamine and 4-morpholino-2,6-dichloro-1,3,5-triazine,

(41) condensate of 2-chloro-4,6-di-(4-n-butylamino-1,2,2,6,6-pentamethylpiperidyl)-1,3,5-triazine and 1,2-bis-(3-aminopropylamino)ethane,

(44) reaction product of maleic acid anhydride-$C_{18}$-$C_{22}$-α-olefin-copolymer with 2,2,6,6-tetramethyl-4-aminopiperidine,

(45) oligomeric compound condensate of 4,4'-hexamethylenebis(amino-2,2,6,6-tetramethyl piperidine) and 2,4-dichloro-6-[(2,2,6,6-tetramethylpiperidin-4-yl)butylamino]-s-triazine end-capped with 2-chloro-4,6-bis(dibutylamino)-s-triazine,

(47) oligomeric compound condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine and binary or ternary combinations thereof.

In some embodiments, the compositions may further comprise one more additional additives selected from the group consisting of antioxidants, organophosphorus stabilizers, ultraviolet light absorbers, acid scavengers, metal deactivators, hydroxylamines, nitrones, amine N-oxides, thiosynergists, peroxide scavengers, nucleating agents, fillers, flame retardants and antistatic agents.

In some embodiments, additional additives may include plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, antistatic agents or clarifiers such as substituted and unsubstituted bisbenzylidene sorbitols.

Additional additives, individually or collectively, may range from any of about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm or about 500 ppm to any of about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm or about 1400 ppm, by weight, based on the weight of the polyolefin.

In other embodiments, additional additives, individually or collectively, may be employed from any of about 0.05 wt % (weight percent), about 0.07 wt %, about 0.09 wt %, about 0.10 wt %, about 0.15 wt %, about 0.20 wt %, about 0.35 wt %, about 0.50 wt %, about 0.75 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.3 wt %, about 1.5 wt %, about 1.7 wt %, about 2.0 wt %, about 2.5 wt %, about 3.0 wt %, about 3.5 wt %, about 4.0 wt %, about 4.5 wt %, about 5.0 wt % or about 5.5 wt % to any of about 5.5 wt %, about 6.0 wt %, about 6.5 wt %, about 7.0 wt %, about 7.5 wt %, about 8.0 wt %, about 8.5 wt %, about 9.0 wt %, about 9.5 wt % or about 10.0 wt %, based on the weight of the polyolefin.

Organophosphorus stabilizers include organic phosphite and organic phosphonite stabilizers and include for example triphenyl phosphite, diphenyl alkyl phosphites, phenyl dialkyl phosphites, tris(nonylphenyl) phosphite, trilauryl phosphite, trioctadecyl phosphite, tris(2,4-di-tert-butylphenyl) phosphite, tris-(2-sec-butylphenyl) phosphite (O), distearyl pentaerythritol diphosphite (F), bis(2,4-di-α-cumylphenyl) pentaerythrtitol diphosphite (K), diisodecyl pentaerythritol diphosphite, bis(2,4-di-tert-butylphenyl) pentaerythritol diphosphite (D), bis(2,6-di-tert-butyl-4-methylphenyl) pentaerythritol diphosphite (E), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2] dioxaphosphocin (A), bis(2,4-di-tert-butyl-6-methylphenyl) methyl phosphite, bis(2,4-di-tert-butyl-6-methylphenyl) ethyl phosphite (G), 2,2',2''-nitrilo[triethyltris(3,3'5,5'-tetra-tert-butyl-1,1'-biphenyl-2,2'-diyl) phosphite] (B), bis(2,4-di-t-butylphenyl) octylphosphite, poly(4,4'-{2,2'-dimethyl-5,5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite), phosphorous acid, mixed 2,4-bis (1,1-dimethylpropyl)phenyl and 4-(1,1-dimethylpropyl) phenyl triesters (CAS No. 939402-02-5), phosphorous acid, triphenyl ester, polymer with alpha-hydro-omega-hydroxy-poly[oxy(methyl-1,2-ethanediyl)], $C_{10-16}$alkyl esters (CAS No. 1227937-46-3),

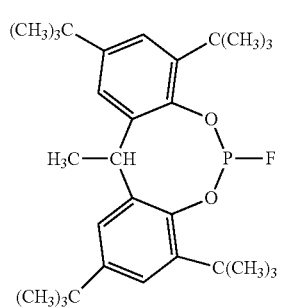
(A)

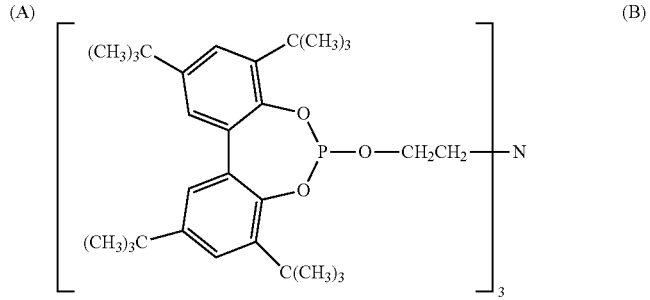
(B)

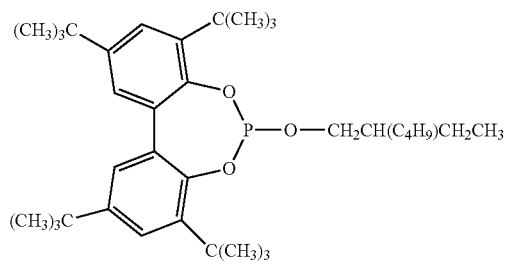
(C)

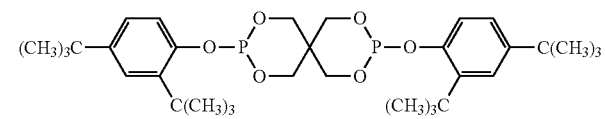
(D)

-continued
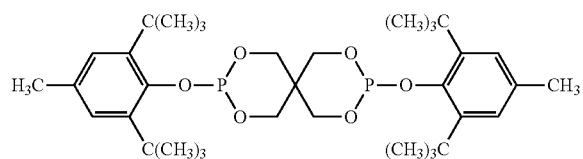
(E)
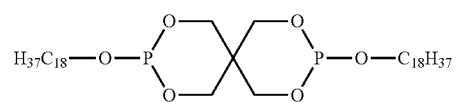
(F)
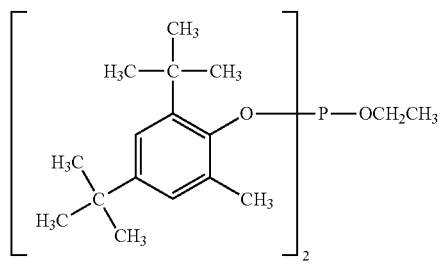
(G)
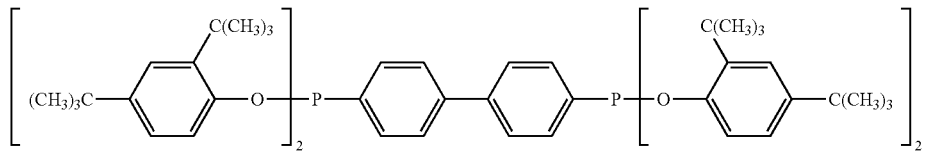
(H)
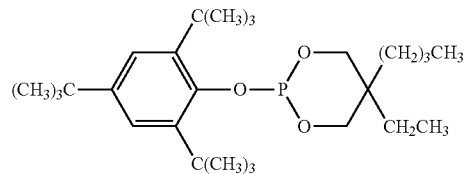
(J)
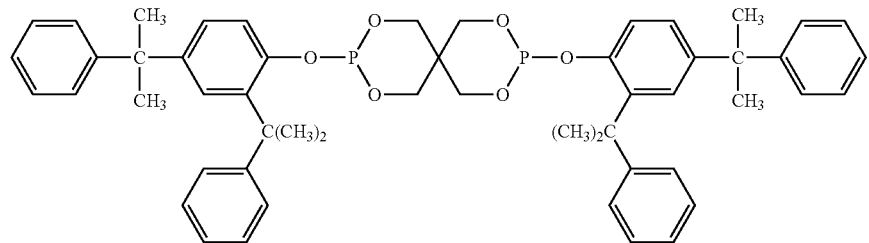
(K)
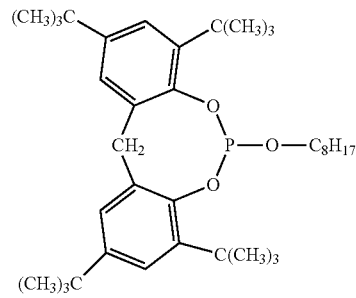
(L)
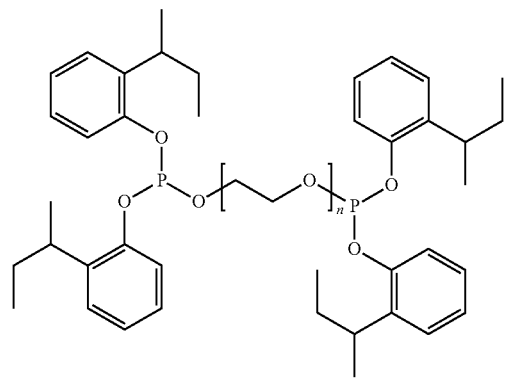
(M)

(N)

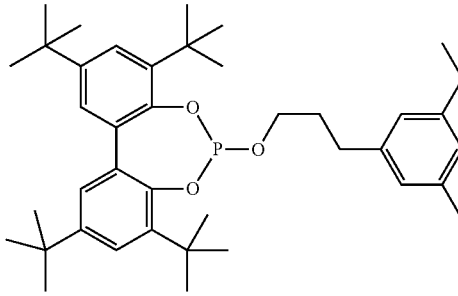

n = 1-5

(O)

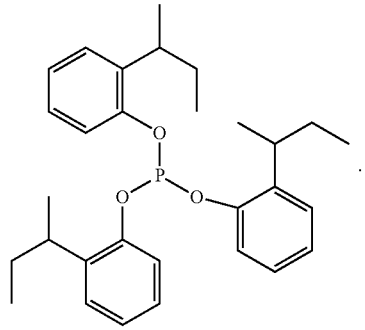

In some embodiments, a combination of one or more organophosphorus stabilizers may be employed.

In certain embodiments, the organophosphorus stabilizer is selected from the group consisting of tris-nonylphenyl phosphite, bis(2,4-di-tert-butylphenyl) pentaerythritol diphosphite, bis(2,4-di-tert-butyl-6-methylphenyl) ethyl phosphite, 2,2',2"-nitrilo[triethyltris(3,3'5,5'-tetra-tert-butyl-1,1'-biphenyl-2,2'-diyl) phosphite], bis(2,4-di-α-cumylphenyl) pentaerythrtitol diphosphite, tris(2,4-di-tert-butylphenyl) phosphite and combinations thereof.

In certain embodiments, the compositions may comprise hindered phenolic antioxidants. Hindered phenolic antioxidants include β-(3,5-di-tert-butyl-4-hydroxyphenyl)propionic acid esters, for instance esters of mono- or polyhydric alcohols, for example with methanol, ethanol, n-octanol, i-octanol, a mixture of linear and branched $C_7$-$C_9$-alkanol, octadecanol, a mixture of linear and branched $C_{13}$-$C_{15}$-alkanol, 1,6-hexanediol, 1,9-nonanediol, ethylene glycol, 1,2-propanediol, 1,3-propanediol, neopentyl glycol, 1,4-cyclohexanedimethanol, glycerol, thiodiethylene glycol, diethylene glycol, triethylene glycol, pentaerythritol, tris(hydroxylethyl)isocyanurate, N,N'-bis-(hydroxyl-ethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

In other embodiments, hindered phenolic antioxidants include tris(3,5-di-tert-butyl-4-hydroxybenzyl) isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, 1,2-bis (3,5-di-tert-butyl-4-hydroxyhydrocinnamoyl)hydrazine, pentaerythritol tetrakis [3-(3,5-di-tert-butyl-4-hydroxyphenyl) propionate], octadecyl 3-(3,5-di-tert-butyl-4-hydroxyphenyl) propionate, N,N'-hexamethylenebis(3,5-di-tert-butyl-4-hydroxyhydrocinnamamide), 1,3,5-tris-(4-tert-butyl-3-hydroxy-2,6-dimethyl benzyl)-1,3,5-triazine-2,4,6-(1H,3H,5H)-trione, 2,2'-methylenebis(4-methyl-6-tert-butylphenol)monoacrylate or alpha-tocopherol.

In certain embodiments, the compositions comprise essentially no or no hindered phenolic antioxidants. Essentially no means not purposefully added and wherein only inadvertent or trace amounts may be present, for instance ≤500 ppm (parts per million), ≤400 ppm, ≤300 ppm, ≤200 ppm, ≤150 ppm, ≤100 ppm, ≤75 ppm, ≤50 ppm, ≤25 ppm, ≤20 ppm, ≤15 ppm, ≤10 ppm, ≤5 ppm, ≤4 ppm, ≤3 ppm, ≤2 ppm or ≤1 ppm, by weight, based on the weight of the polyolefin.

Thiosynergists include for example dilauryl thiodipropionate or distearyl thiodipropionate.

Acid scavengers include hydrotalcites and amorphous basic aluminum magnesium carbonates, such as those described in U.S. Pat. Nos. 4,427,816, 5,106,898 and 5,234, 981. Hydrotalcite is also known as hycite, DHT4A, DHT4V, DHT4Z, DHT4A2 or DHT4C. Hydrotalcites are natural or synthetic and may include a coating. Natural hydrotalcite is held to possess a structure $Mg_6Al_2(OH)_{16}CO_{3.4}$ $H_2O$. A typical empirical formula of a synthetic hydrotalcite is $Al_2Mg_{4.35}OH_{11.36}CO_{3(1.67)}$.x $H_2O$. Examples of the synthetic product include $Mg_{0.7}Al_{0.3}(OH)_2(CO_3)_{0.15}$.0.54 $H_2O$, $Mg_{4.5}Al_2(OH)_{13}CO_3$.3.5 $H_2O$ and $Mg_{4.2}Al(OH)_{12.4}CO_3$.

In some embodiments, acid scavengers include metal salts of fatty acids, for example alkali or alkali earth metal salts of fatty acids. In some embodiments, acid scavengers include calcium, magnesium, zinc, sodium, potassium or aluminum salts of fatty acids. In some embodiments, acid scavengers include calcium, magnesium, zinc, sodium, potassium or aluminum stearate, behenate, ricinoleate or palmitate. In certain embodiments, acid scavengers include calcium stearate, zinc stearate, magnesium behenate, magnesium stearate, sodium ricinoleate and potassium palmitate. In other embodiments, acid scavengers include zinc oxide.

In some embodiments, a combination of one or more acid scavengers may be employed.

Ultraviolet (UV) light absorbers may be selected from the group consisting of hydroxyphenylbenzotriazole, tris-aryls-triazine, hydroxybenzoate, 2-hydroxybenzophenone and cyanoacrylate ultraviolet light absorbers (UVAs).

Hydroxyphenylbenzotriazole UVAs may include those disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2- hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzo-triazole, methyl 3-(5-trifluoromethyl-2H-benzotriazol-2-yl)-5-t-butyl-4-hydroxy-hydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butyl-phenyl)-2H-benzotriazole and 5-phenylsulfonyl-2-(2-hydroxy-3,5-di-t-butylphenyl)-2H-benzotriazole.

Tris-aryl-s-triazine UVAs may include those disclosed in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, and US published application nos. 2015/329684 and 2017/327475, for example 2,4,6-tris(2-hydroxy-3-methyl-4-hexyloxyphenyl)-1,3,5-triazine, dodecanedioic acid, 1,12-bis[2-[4-(4,6-diphenyl-1,3,5-triazin-2-yl)-3-hydroxyphenoxy]ethyl] ester, 4,6-bis-(2,4-dimethylphenyl)-2-(2-hydroxy-4-octyloxyphenyl)-s-triazine, CYASORB 1164, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)-phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonyliso-propylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxy-propyloxy)phenyl]-s-triazine, 2,4,6-tris[2-hydroxy-4-(3-sec-butyloxy-2-hydroxypropyloxy)-phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, TINUVIN 400, 4,6-bis-(2,4-dimethyl-phenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

Hydroxybenzoate UV absorbers may include for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2-Hydroxybenzophenone UV absorbers include for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Cyanoacrylate UV absorbers include for instance pentaerythritol tetrakis(2-cyano-3,3-diphenylacrylate), α-cyano-β,β-diphenylacrylic acid ethyl ester or isooctyl ester and α-cyano-β-methyl-p-methoxy-cinnamic acid methyl ester or butyl ester.

In some embodiments, the UVA may include 5-chloro-2-(3-t-butyl-2-hydroxy-5-methylphenyl)-2H-benzotriazole, 2-(3,5-bis-α-cumyl-2-hydroxyphenyl)-2H-benzotriazole, 4,6-diphenyl-2-(4-hexyloxy-2-hydroxyphenyl)-s-triazine, 4,6-bis-(2,4-dimethylphenyl)-2-(2-hydroxy-4-octyloxyphenyl)-s-triazine, hexadecyl 3,5-di-tert-butyl-4-hydroxybenzoate or 4-octyloxy-2-hydroxybenzophenone.

Many of the UVAs are commercial, for example TINUVIN 326, TINUVIN 234, TINUVIN 1577, TINUVIN 1600, CYASORB UV 1164, CYASORB THT, CYASORB UV 2908, CHIMASSORB 81, UVINUL 3030, ADK LA-F70, ADK LA-1000, TINUVIN 400, etc.

Hydroxylamine stabilizers may include for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or, in certain embodiments, N,N-di($C_{16}$-$C_{18}$alkyl)hydroxylamine.

The amount of benzofuranone stabilizers employed may range from any of about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm or about 500 ppm to any of about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm or about 1400 ppm, by weight, based on the weight of the polyolefin.

In other embodiments, the amount of present benzofuranone stabilizers employed may range from any of about 0.05 wt % (weight percent), about 0.07 wt %, about 0.09 wt %, about 0.10 wt %, about 0.15 wt %, about 0.20 wt %, about 0.25 wt %, about 0.30 wt %, about 0.35 wt %, about 0.40 wt %, about 0.50 wt %, about 0.60 wt %, about 0.65 wt %, about 0.70 wt %, about 0.75 wt %, about 0.80 wt %, about 0.90 wt %, about 1.0 wt %, about 1.3 wt %, about 1.5 wt %, about 1.7 wt %, about 2.0 wt %, about 2.5 wt %, about 3.0 wt %, about 3.5 wt %, about 4.0 wt %, about 4.5 wt %, about 5.0 wt % or about 5.5 wt % to any of about 5.5 wt %, about 6.0 wt %, about 6.5 wt %, about 7.0 wt %, about 7.5 wt %, about 8.0 wt %, about 8.5 wt %, about 9.0 wt %, about 9.5 wt % or about 10.0 wt %, based on the weight of the polyolefin.

In other embodiments, the amount of present benzofuranone stabilizers may range from any of about 1 wt %, about 5 wt %, about 10 wt %, about 15 wt %, about 20 wt %, about 25 wt % or about 30 wt % to any of about 35 wt %, about 40 wt %, about 45 wt % or about 50 wt %, based on the weight of the polyolefin.

The amount of hindered amine light stabilizers employed may range from any of about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 250 ppm, about 300 ppm, about 350 ppm, about 400 ppm, about 450 ppm or about 500 ppm to any of about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm or about 1400 ppm, by weight, based on the weight of the polyolefin.

In other embodiments, the amount of hindered amine light stabilizers employed may range from any of about 0.05 wt % (weight percent), about 0.07 wt %, about 0.09 wt %, about 0.10 wt %, about 0.15 wt %, about 0.20 wt %, about 0.35 wt %, about 0.50 wt %, about 0.75 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.3 wt %, about 1.5 wt %, about 1.7 wt %, about 2.0 wt %, about 2.5 wt %, about 3.0 wt %, about 3.5 wt %, about 4.0 wt %, about 4.5 wt %, about 5.0 wt % or about 5.5 wt % to any of about 5.5 wt %, about 6.0 wt %, about 6.5 wt %, about 7.0 wt %, about 7.5 wt %, about 8.0 wt %, about 8.5 wt %, about 9.0 wt %, about 9.5 wt % or about 10.0 wt %, based on the weight of the polyolefin.

In some embodiments, one or more benzofuranones and one or more hindered amine light stabilizers may be employed in a weight/weight ratio of from any one of about 1/99, about 1/90, about 1/80, about 1/70, about 1/60, about 1/50, about 1/40, about 1/30, about 1/20, about 1/10, about 1/9, about 1/8, about 1/7, about 1/6, about 1/5, about 1/4, about 1/3, about 1/2 or about 1/1 to any one of about 2/1, about 3/1, about 4/1, about 5/1, about 6/1, about 7/1, about 8/1, about 9/1, about 10/1, about 20/1, about 30/1, about 40/1, about 50/1, about 60/1, about 70/1, about 80/1, about 90/1 or about 99/1.

In some embodiments, hindered amine light stabilizers are employed at equal or higher weight levels than the one or more benzofuranones. For example, in some embodiments, the weight/weight ratio of the one or more benzofuranones to one or more hindered amine light stabilizers may be from any one of about 0.05, about 0.10, about 0.15, about 0.20, about 0.25, about 0.30, about 0.35, about 0.40, about 0.45 or about 0.50 to any one of about 0.55, about 0.60, about 0.65, about 0.70, about 0.75, about 0.80, about 0.85, about 0.90, about 0.95 or about 1.0.

Also disclosed are additive compositions comprising the one or more benzofuranone compounds and the one or more hindered amine light stabilizers. The weight/weight ratio of the benzofuranones to the hindered amine light stabilizers may be as above.

In certain embodiments, the polyolefin comprises polyethylene (PE) homopolymers, polyethylene random or block copolymers, polypropylene (PP) homopolymers, polypropylene random or block copolymers, ethylene/propylene copolymers, a mixture of polypropylene and polyethylene or a mixture of different types of polyethylene. In certain embodiments, the polyolefin is polypropylene. In some embodiments, polyethylene is linear low density (LLDPE), low density (LDPE), medium density (MDPE) or high density (HDPE). Mixtures mentioned above are for example PP/HDPE, PP/LDPE and LDPE/HDPE. Also included are ternary mixtures such as PP/HDPE/LLDPE. The polyolefins may be formulated with or without crosslinking.

The polyolefin composition contains for instance ≥ about 10 weight percent (wt %) polyolefin, for instance ≥ about 15 wt %, ≥ about 20 wt %, ≥ about 25 wt %, ≥ about 30 wt %, ≥ about 35 wt %, ≥ about 40 wt %, ≥ about 45 wt %, ≥ about 50 wt %, ≥ about 55 wt %, ≥ about 60 wt %, ≥ about 65 wt %, ≥ about 70 wt %, ≥ about 75 wt %, ≥ about 80 wt % or ≥ about 85 wt % polyolefin, based on the weight of the composition.

Polypropylene may be a polypropylene homopolymer, a polypropylene random copolymer, alternating or segmented copolymer or block copolymer containing one or more comonomers selected from the group consisting of ethylene, $C_4$-$C_{30}$-α-olefins, vinylcyclohexane, vinylcyclohexene, $C_4$-$C_{20}$alkandienes, $C_5$-$C_{12}$cycloalkandienes and norbornene derivatives; the total mol amount of propylene and the comonomer(s) being 100%.

Polypropylene copolymer also covers long chain branched polypropylene copolymer.

Examples of suitable $C_4$-$C_{30}$α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene, 4-methyl-1-pentene, 1-eicosene, 1-docosene, 1-tetracosene, 1-hexacosene, 1-octacosene and 1-triacontene.

Examples of suitable $C_4$-$C_{20}$alkandienes include hexadiene and octadiene. Examples of suitable $C_5$-$C_{12}$cycloalkandienes include cyclopentadiene, cyclohexadiene and cyclooctadiene. Examples of suitable norbornene derivatives include 5-ethylidene-2-norbornene (ENB), dicyclopentadiene (DCP) and methylene-domethylene-hexahydronaphthaline (MEN).

A propylene/ethylene copolymer contains for example about 50% to about 99.9%, in some embodiments about 80% to about 99.9% and in other embodiments about 90% to about 99.9% by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) may contain more than about 90 mol %, from about 90 mol % to about 99.9 mol % or from about 90 mol % to about 99 mol % propylene.

A propylene copolymer wherein the comonomer is a $C_4$-$C_8$α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene may contain more than 80 mol %, from about 80 to about 99.9 mol % or from about 80 mol % to about 99 mol % propylene.

Further examples of polypropylene are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

Allyl or vinyl terminated oligomers of ethylene or propylene may be employed as branches in polymerization reactions with propylene to prepare branched polypropylenes of high melt strength as disclosed in U.S. Pat. No. 8,399,725 and U.S. Pub. Nos. 2013/0274425, 2013/0274425, 2013/0030135 and 2013/0137829.

Polypropylene's linear chain structure results in the polymer exhibiting low melt strength and a lack of strain hardening. This can result in processing issues where polymer extensibility is needed. In contrast, polypropylenes exhibiting high melt strength are valued in industrial converting operations such as blow molding, thermoforming or foaming of polypropylene sheet. Polypropylene based compositions of this invention exhibit acceptable melt strength, extensibility and strain hardening to produce extruded profiles and siding.

Advantageously, the polyolefin comprises a polypropylene homopolymer or copolymer of a suitably high melt strength, optionally blended with a polyethylene homopolymer or copolymer. The blend may further contain a third polymer suitable to facilitate compatibility, partial miscibility or miscibility of the different polyolefins. Such materials are referred to as interfacial tension reducing agents or compatibilizers.

Suitable compatibilizers are typically polymers that contain two or more different segments each of which are miscible or compatible with the individual components to be blended. A compatibilized polymer blend need not be fully miscible nor satisfy all thermodynamics of mixing (e.g. resulting in a single phase, or single glass transition temperature), yet such a blend of different polymer structures will exhibit improved resultant properties over the individual components.

One type of compatibilizer for blending of PP and PE are segmented "olefin block copolymers" or "OBC", containing propylene, ethylene and optionally additional alpha-olefin sequences such as those produced by Dow Global Technologies and taught in U.S. Pub. Nos. 2011/032621, 2011/060103, 2010/298515, 2011/054121 and 2011/015354. Included are Dow products under the trade name INFUSE and ExxonMobil VISTAMAXX products. These block copolymers are produced with an overall molecular weight distribution and segment molecular weight distribution such that Mw/Mn>1.4, with two or more ethylene and alpha-olefin blocks per chain and low molecular weights (Mw<200,000 g/mol). These alternating block copolymers are characterized by crystallizable, rigid 'hard block' segments and an amorphous, elastomeric 'soft block' content. The hard block content ranges from 12-84 wt. % in these OBCs and total 1-octene content (i.e. conferring long chain branches) range from 3 to 14 wt. %. OBCs may compatibilize a blend of PP and HDPE where an increase in elongation to break and tensile strength can be achieved compared to a non compatibilized blend of HDPE and PP.

The polypropylene homopolymer or copolymer or blend with polyethylene optionally compatibilized may be chemically crosslinked to introduce long chain branches (LOB) off of the polypropylene main chain resulting in higher melt strength and extensibility and lower melt flow than is generally commercially available.

Chemical crosslinking of a polypropylene homopolymer or copolymer with another polypropylene or with a polyethylene homo- or copolymer and/or with a compatibilizing material is advantageous. Such crosslinking processes may impart a valuable increase in polyolefin blend melt strength, melt extensibility, mechanical and tensile strength useful in the present extrusion processes. Such crosslinking processes onto polypropylene may produce long chain branching (LOB) on the polypropylene main chain and create an enhanced amount of polymer chain entanglements that results in higher polymer melt strength.

Crosslinking may be accomplished with agents such as organic peroxides or by treatment with a radiation source such as ultraviolet light, electron beam or gamma irradiation. Radiation may be accomplished in a reduced oxygen or zero oxygen environment. For instance, a polypropylene of high melt strength and melt extensibility is obtainable by the blending of a linear polypropylene with a branched polypropylene (b-PP) in an extruder. The b-PP is prepared by reacting a peroxide with an unmodified polypropylene and optionally a bifunctional unsaturated monomer capable of grafting onto the unmodified polypropylene to produce long chain branches, US2015175789. In another example, U.S. Pat. Nos. 5,508,318, 5,731,362, 5,591,785, 5,554,668 and 4,916,198 disclose compounding of blends of irradiated and non-irradiated olefin polymer materials suitable for extrusion.

In contrast to downstream extrusion or polymer chemical modification to form crosslinks or long chain branches to improve melt strength, the formation of long chain branching on polyolefins may be conducted upstream during polymer manufacture. In an example, polyethylene may be modified in a polymerization unit via exposure to a low level of oxygen, called 'oxygen tailoring', resulting in formation of long chain branching and enhanced melt strength, as taught in U.S. Pub. No. 2012/100357.

The polyolefin may contain an additive that promotes a higher level of crystallinity upon melt converting the polymer into shaped articles. Such additives are referred to as nucleating agents.

The degree of crystallinity in polypropylene is an important parameter influencing properties such as modulus, yield stress, strength, etc. Within the scope of this invention is the use of nucleating agents which influence the favorable formation of a degree of crystallinity that improves polymer melt strength during extrusion processing and improvement of mechanical properties in the end use article. Suitable nucleating agents are for instance sodium benzoate, 2,2'-methylene-bis(4,6-di-tert-butylphenyl)phosphate, zinc glycerolate, calcium salt of 1,2-dicarboxylic acid cyclohexane, aromatic trisamide compounds, cis-endo-bicyclo[2.2.1]heptane-2,3-dicarboxylic acid disodium salt, aluminum hydroxy-bis[4-(tert-butyl)benzoate] and sorbitols such as 1,3:2,4-bis(3,4-dimethyl-benzylidene)sorbitol 1,3:2,4-bis(4-methylbenzylidene)sorbitol or 1,3:2,4-bis(3,4-dimethylbenzylidene)sorbitol, as taught in U.S. Pat. Nos. 7,423,088, 7,790,793 and 8,183,312 and U.S. Pub. No. 2012/0190797.

Nucleating agents may be present for instance from about 10 parts per million (ppm) to about 10,000 ppm, from about 12 ppm to about 1,000 ppm, from about 12 ppm to about 500 ppm or from about 12 ppm to about 300 ppm or about 400 ppm, by weight based on the weight of the polyolefin.

The polyolefin advantageously contains an inorganic (mineral) filler to balance melt strength and extensibility or drawability to allow extrusion production of profiles and siding. Fillers are described in more detail below.

The polyolefin comprising a polypropylene homopolymer or copolymer optionally blended with a polyethylene homopolymer or copolymer, where the blend may further contain a compatibilizer may exhibit a high melt strength. Melt strength for the polyolefin may be at least about 4 centiNewtons (cN) at 210° C. For instance, the melt strength of the polyolefin is about 4, about 5, about 6, about 7, about 8, about 9, about 10, about 11, about 12, about 13, about 14, about 15, about 16, about 17, about 18, about 19, about 20, about 21, about 22, about 23 about 24 or about 25 centiNewtons at 210° C. For instance the melt strength is ≥ about 5, ≥ about 7, ≥ about 9, ≥ about 11, ≥ about 13, ≥ about 15, ≥ about 17, ≥ about 19, ≥ about 21 or ≥ about 23 centiNewtons at 210° C.

Polyolefins can be prepared by the following methods:
a) radical polymerization (normally under high pressure and at elevated temperature) or
b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler-Natta, TNZ (DuPont), metallocene or single site catalysts (SSC).

Polypropylenes are produced by processes as described in literature including Kissin, Y. V. (2008), Alkene Polymerization Reactions with Transition Metal Catalysts, Elsevier, pp. 207-. ISBN 978-0-444-53215-2; Hoff, Ray and Mathers, Robert T. (2010), Handbook of Transition Metal Polymerization Catalysts, John Wiley & Sons, pp. 158-ISBN 978-0-470-13798-7; Moore, E. P. (1996) Polypropylene Handbook, Polymerization, Characterization, Properties, Processing, Applications, Hanser Publishers: New York, ISBN 1569902089; Benedikt, G. M. and Goodall, B. L. (eds.) (1998) Metallocene Catalyzed Polymers, ChemTech Publishing: Toronto, ISBN 978-1-884207-59-4; Malpass, D. B., Introduction to Industrial Polyethylene, Properties, Catalysts, Processes, Wiley Publ., (2010); and Malpass, D. B., Introduction to Industrial Polypropylene, Properties, Catalysts, Processes, Wiley Publ., (2012).

In some embodiments, polyolefins include virgin polyolefin, polyolefin recyclates or mixtures thereof. Polyolefin recyclates may be obtained from domestic, commercial or industrial waste or from useful material collections. Recyclates may originate from packaging materials, for example, films, bags, bottles and other containers or foams. It is also possible for polyolefins which have been previously damaged by use, storage or processing to be stabilized. These materials originate, for example, from useful material collections or return obligations, for example from the automobile industry, electrical/electronic industry, construction, agriculture or the textile industry.

The incorporation of the present benzofuranones and hindered amine light stabilizers into a polyolefin is carried out by known methods, for example before or after molding or also by applying a dissolved or dispersed additive mixture to the polyolefin, with or without subsequent evaporation of the solvent. Present benzofuranones and hindered amine light stabilizers can also be added to a polyolefin in the form of a masterbatch which contains the additives in a concentration of, for example, about 2% to about 40% by weight, based on the total weight of the masterbatch. In the form of a masterbatch, the polymer of the masterbatch need not be the same as the polyolefin. Molding may be carried out with known mixing machines, for instance mixers, kneaders or extruders.

Present benzofuranones and hindered amine light stabilizers can be premixed or added individually. Present benzofuranones and hindered amine light stabilizers can also be added before or during the polymerization or before crosslinking. Present benzofuranones and hindered amine light stabilizers can be incorporated into a polyolefin in pure form or encapsulated in waxes, oils or polymers.

Present benzofuranones and hindered amine light stabilizers can also be sprayed onto a polyolefin. They are able to dilute other additives or their melts so that they may be sprayed also together with these additives onto a polyolefin.

In certain embodiments, the present benzofuranone additives and hindered amine light stabilizers are incorporated into a polyolefin by melt blending in an extruder. The present benzofuranones and hindered amine light stabilizers may be added together or separately.

In some embodiments, a process of preparing a polyolefin composition includes measurement of raw materials by weight followed by the dry blending of raw ingredients. The mixture may be fed to a screw extruder at a constant feed rate to extrude the material into a desired form, followed by water cooling and drying.

Also subject of the invention are articles, e.g. shaped articles, comprising the present polyolefin compositions. Examples of shaped articles include and are not limited to those listed in items I-1) through IIV-8).

I-1) Floating devices, marine applications, pontoons, buoys, plastic or composite lumber for decks or piers, boats, kayaks, oars and beach reinforcements.

I-2) Automotive applications, interior applications, exterior applications, for example bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side moldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, for example sign postings, posts for road marking, car accessories, warning triangles, medical cases, helmets, tires.

I-4) Devices for plane, railway, motor car (car, motorbike, trucks) including furnishings.

I-5) Devices for space applications, for instance rockets and satellites, e.g. reentry shields.

I-6) Devices for architecture and design, mining applications, acoustic quietized systems, street refuges and shelters.

II-1) Appliances, cases and coverings in general and electric/electronic devices (personal computer, telephone, portable phone, printer, television-sets, audio and video devices), flower pots, satellite TV bowl and panel devices.

II-2) Jacketing for other materials such as steel or textiles.

II-3) Devices for the electronic industry, for example insulation for plugs, especially computer plugs, cases for electric and electronic parts, printed boards and materials for electronic data storage such as chips, check cards or credit cards.

II-4) Electric appliances, for instance washing machines, tumblers, ovens (microwave oven), dish-washers, mixers and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines and vacuum cleaners.

III-1) Technical articles such as cogwheel (gear), slide fittings, spacers, screws, bolts, handles and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves and conveyor belts.

III-3) Sanitary articles, for example shower cubicles, lavatory seats, covers and sinks.

III-4) Hygienic articles, for instance diapers (babies, adult incontinence), feminine hygiene articles, shower curtains, brushes, mats, tubs, mobile toilets, tooth brushes and bed pans.

III-5) Pipes (cross-linked or not) for water, waste water and chemicals, pipes for wire and cable protection, pipes for gas, oil and sewage, guttering, down pipes and drainage systems.

III-6) Profiles of any geometry (window panes) and siding.

III-7) Glass substitutes, for example extruded or co-extruded plates, glazing for buildings (monolithic, twin or multiwall), aircraft, schools, extruded sheets, window film for architectural glazing, train, transportation, sanitary articles and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards and tiles.

III-9) Intake and outlet manifolds.

III-10) Cement-, concrete-, composite-applications and covers, siding and cladding, hand rails, banisters, kitchen work tops, roofing, roofing sheets, tiles and tarpaulins.

IV-1) Plates (walls and cutting board), trays, artificial grass, synthetic (such as Astro-Turf®), artificial covering for stadium rings (athletics), artificial floor for stadium rings (athletics) and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags and bags. Non-woven fabrics such as medical fabrics and related apparel, industrial apparel, outdoor fabrics, in-home furnishing and construction fabrics.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, center console, dashboard, cockpits, door, overhead console module, door trim, headliners, interior lighting, interior mirrors, parcel shelf, rear luggage cover, seats, steering column, steering wheel, textiles and trunk trim.

V) Films (packaging, dump, laminating, agriculture and horticulture (greenhouse covers, tunnel, low walk-in tunnel, high tunnel, mulch, silage, silo-bags, silo-stretch, fumigation, air bubble, keder, solawrap, thermal, bale wrap, nursery, film tubes), greenhouse, mulch, tunnel, silage), bale wrap, swimming pools, waste bags, wallpaper, stretch film, raffia, desalination film, batteries and connectors. Films may have a mono-layer structure or a multi-layer structure, for example three, five or seven layers. Examples include film structures represented by A-B-A, A-B-C, A-B-C-B-A, A-B-C-B-D, A-B-C-D-C-B-A, A-A-B-C-B-A-A, wherein A, B, C and D represent different polymers or tackifiers. Layers may also be arranged to provide films having an even number of layers, i.e. two, four or six layers such as A-A-B-A, A-A-B-B, A-A-B-A-A, A-B-B-A-A, A-A-B-C-B, A-A-B-C-A-A and the like.

VI-1) Food packing and wrapping (flexible and solid), bottles.

VI-2) Storage systems such as boxes (crates), luggage, chest, household boxes, pallets, shelves, tracks, screw boxes, packs and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes) and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards and display technologies.

VII-8) Devices of filled polymers (talc, chalk, china clay (kaolin), wollastonite, pigments, carbon black, $TiO_2$, mica, nanocomposites, dolomite, silicates, glass, asbestos).

In certain embodiments, a shaped article is a film, pipe, profile, bottle, tank, container or fiber. The shaped articles may be prepared by molding, for instance injection molding, blow molding, compression molding, rotomolding, slush-molding or extrusion molding.

The methods and compositions of the present invention provide for excellent color performance and enhanced thermal stability of polyolefins during melt processing. Melt processing stability may be exhibited by improved retention of molecular weight and maintenance of polymer molecular architecture.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

U.S. patents, U.S. patent applications and published U.S. patent applications discussed herein are hereby incorporated by reference.

Unless otherwise indicated, all parts and percentages are by weight. Weight percent (wt %), if not otherwise indicated, is based on an entire composition free of any volatiles.

EXAMPLES

The following additives are employed in the Examples: AO1 is a hindered phenolic antioxidant, pentaerythritol tetrakis(3-(3,5-di-tert-butyl-4-hydroxyphenyl)propionate); AO2 is a hindered phenolic antioxidant, octadecyl 3-(3,5-di-tert-butyl-4-hydroxyphenyl)propanoate; AO3 is a hindered phenolic antioxidant, the calcium salt of the monoethyl ester of 3,5-di-tert-butyl-4-hydroxybenzylphosphonic acid; Phos1 is an organophosphorus stabilizer tris(2,4-di-tert-butylphenyl) phosphite; the hindered amine light stabilizers (HALS) and the benzofuranone stabilizers are as labelled herein and above.

Additive loadings are in ppm (parts per million) by weight, based on the weight of the polymer. Where total amount of phosphorus (P) is listed with the formulations, this is also reported in ppm by weight, based on the weight of the polymer.

Polymer plaques are tested for color development according to ASTM-313 with a DCI SF600 spectrophotometer; large area view; spectral component included; 2 degree observer. Color is expressed as yellowness index (YI).

Melt flow rate retentions are determined for polymer samples from the zero pass and fifth pass extrudate. Melt flow rate is performed according to ASTM-1238 on a Tinius-Olsen Extrusion Plastometer at 190° C.; 2.16 kg; measured in grams of polymer that flow out of a defined orifice in 10 minutes.

Oxidative Induction Time (OIT) is a measure of oxidative stability of the polymer. OIT is measured with a differential scanning calorimeter (DSC). Scans are collected using a heating rate of 10° C./minute under nitrogen from 50° C. to 190° C., switching to oxygen and holding at isothermal conditions until catastrophic oxidation. Time to onset of catastrophic oxidation (observed as a strong exotherm) is reported in minutes.

Example 1

Fiber Grade zn-Polypropylene

Fiber grade Ziegler-Natta polypropylene homopolymer (zn-PP) is formulated with additives listed below.

1) 500 ppm Phos1; 500 ppm AO1; 24 ppm P
2) 1000 ppm Phos1; 500 ppm AO1; 48 ppm P
3) 1000 ppm Phos1; 500 ppm HALS (45); 43 ppm P
4) 625 ppm Phos1; 500 ppm HALS (45); 125 ppm benzofuranone (109); 21 ppm P
5) 625 ppm Phos1; 500 ppm HALS (45); 125 ppm benzofuranone (113); 22 ppm P
6) 625 ppm Phos1; 500 ppm HALS (45); 125 ppm benzofuranone (105); 23 ppm P
7) 625 ppm Phos1; 500 ppm HALS (36); 125 ppm benzofuranone (109); 21 ppm P
8) 625 ppm Phos1; 500 ppm HALS (41); 125 ppm benzofuranone (109); 21 ppm P
9) 625 ppm Phos1; 500 ppm HALS (35); 125 ppm benzofuranone (109); 21 ppm P
10) 625 ppm Phos1; 500 ppm HALS (14); 125 ppm benzofuranone (109); 22 ppm P
11) 625 ppm Phos1; 500 ppm HALS (34); 125 ppm benzofuranone (109); 21 ppm P
12) 625 ppm Phos1; 500 ppm HALS (47); 125 ppm benzofuranone (109); 22 ppm P Additives are blended with granular polymer free of any stabilization additives. In addition to the additives listed, all formulations are blended with 600 ppm calcium stearate. Thoroughly blended formulations are melt compounded in a twin screw extruder at 210° C. under nitrogen. The compounded formulations are extruded multiple times in a single screw extruder fitted with a Maddock mixing section at 260° C., open to air. Pelletized samples of the third pass extrudate are compression molded into 3.2 mm plaques. Results are below.

| formulation | YI | melt flow (zero pass) | melt flow (fifth pass) | OIT |
|---|---|---|---|---|
| 1 | 7.1 | 14.76 | 25.48 | 13 |
| 2 | 6.6 | 14.15 | 21.50 | 19 |
| 3 | 4.8 | 15.46 | 37.32 | 6 |

-continued

| formulation | YI | melt flow (zero pass) | melt flow (fifth pass) | OIT |
|---|---|---|---|---|
| 4 | 6.7 | 14.65 | 21.53 | 7 |
| 5 | 13.3 | 14.51 | 19.96 | 6 |
| 6 | 16.0 | 15.21 | 19.79 | 6 |
| 7 | 5.5 | 15.38 | 28.94 | 6 |
| 8 | 5.4 | 15.61 | 26.45 | 8 |
| 9 | 6.1 | 14.70 | 23.84 | 3 |
| 10 | 8.8 | 15.04 | 25.24 | 4 |
| 11 | 8.0 | 15.17 | 22.95 | 4 |
| 12 | 10.3 | 13.95 | 18.98 | 7 |

Example 2

Blown Film Grade m-LLDPE

Blown film grade metallocene linear low density polyethylene (m-LLDPE) is formulated with additives listed below.
1) 500 ppm AO2; 0 ppm P
2) 500 ppm Phos1; 500 ppm AO2; 24 ppm P
3) 1000 ppm Phos1; 500 ppm AO2; 48 ppm P
4) 375 ppm Phos1; 500 ppm AO2; 125 ppm benzofuranone (109); 23 ppm P
5) 450 ppm Phos1; 500 ppm AO2; 150 ppm benzofuranone (109); 27 ppm P
6) 600 ppm Phos1; 150 ppm benzofuranone (109); 34 ppm P
7) 800 ppm Phos1; 200 ppm benzofuranone (109); 46 ppm P Additives are blended with granular polymer free of any stabilization additives. In addition to the additives listed, all formulations are blended with 500 ppm zinc stearate. Thoroughly blended formulations are melt compounded in a twin screw extruder at 210° C. under nitrogen. The compounded formulations are extruded multiple times in a single screw extruder fitted with a Maddock mixing section at 260° C., open to air. Pelletized samples of the third pass extrudate are compression molded into 3.2 mm plaques. Results are below.

| formulation | YI | OIT |
|---|---|---|
| 1 | 0.6 | 22 |
| 2 | 0.6 | 29 |
| 3 | 0.2 | 42 |
| 4 | 1.3 | 85 |
| 5 | 0.7 | 101 |
| 6 | −0.6 | 8 |
| 7 | −0.5 | 10 |

Example 3

Blown Film Grade m-LLDPE

Blown film grade metallocene linear low density polyethylene (m-LLDPE) is formulated with additives listed below.
1) 500 ppm Phos1; 500 ppm AO1
2) 500 ppm Phos1; 1000 ppm AO1
3) 1000 ppm Phos1; 500 ppm HALS (45)
4) 650 ppm Phos1; 500 ppm HALS (45); 125 ppm benzofuranone (109)
5) 650 ppm Phos1; 500 ppm HALS (45); 125 ppm benzofuranone (113)
6) 650 ppm Phos1; 500 ppm HALS (45); 125 ppm benzofuranone (105)
7) 650 ppm Phos1; 500 ppm HALS (36); 125 ppm benzofuranone (109)
8) 650 ppm Phos1; 500 ppm HALS (41); 125 ppm benzofuranone (109)
9) 650 ppm Phos1; 500 ppm HALS (35); 125 ppm benzofuranone (109)
10) 650 ppm Phos1; 500 ppm HALS (14); 125 ppm benzofuranone (109)
11) 650 ppm Phos1; 500 ppm HALS (34); 125 ppm benzofuranone (109)
12) 650 ppm Phos1; 500 ppm HALS (47); 125 ppm benzofuranone (109)

Additives are blended with granular polymer free of any stabilization additives. Thoroughly blended formulations are melt compounded in a twin screw extruder at 210° C. under nitrogen. The compounded formulations are extruded multiple times in a single screw extruder fitted with a Maddock mixing section at 260° C., open to air. Pelletized samples of the third pass extrudate are compression molded into 3.2 mm plaques. Results are below.

| formulation | YI | melt flow (zero pass) | melt flow (fifth pass) | OIT |
|---|---|---|---|---|
| 1 | 3.0 | 3.77 | 3.24 | 83 |
| 2 | 3.3 | 3.76 | 3.50 | 118 |
| 3 | 2.2 | 3.71 | 2.15 | 31 |
| 4 | 1.3 | 3.69 | 2.55 | 27 |
| 5 | 2.8 | 3.68 | 2.89 | 34 |
| 6 | 1.8 | 3.68 | 2.71 | 28 |
| 7 | 1.9 | 3.65 | 2.33 | 28 |
| 8 | 1.3 | 3.55 | 1.96 | 46 |
| 9 | 2.9 | 3.62 | 2.68 | 15 |
| 10 | 2.5 | 3.68 | 3.12 | 19 |
| 11 | 5.0 | 3.66 | 3.41 | 37 |
| 12 | 4.1 | 3.67 | 3.28 | 42 |

Example 4

Blown Film Grade zn-LLDPE

Blown film grade Ziegler-Natta linear low density polyethylene (zn-LLDPE) is formulated with additives listed below.
1) 500 ppm Phos1; 450 ppm of a 4/5 weight ratio of AO1/AO2; 24 ppm P
2) 1000 ppm Phos1; 450 ppm of a 4/5 weight ratio of AO1/AO2; 48 ppm P
3) 413 ppm Phos1; 450 ppm of a 4/5 weight ratio of AO1/AO2; 138 ppm benzofuranone (109); 20 ppm P
4) 413 ppm Phos1; 450 ppm AO3; 138 ppm benzofuranone (109); 25 ppm P
5) 800 ppm Phos1; 200 ppm benzofuranone (109); 38 ppm P
6) 750 ppm Phos1; 250 ppm benzofuranone (109); 36 ppm P
7) 670 ppm Phos1; 330 ppm benzofuranone (109); 32 ppm P
8) 500 ppm Phos1; 500 ppm benzofuranone (109); 43 ppm P
9) 800 ppm Phos1; 200 ppm benzofuranone (109); 250 ppm HALS (35); 38 ppm P 10) 750 ppm Phos1; 250 ppm benzofuranone (109); 250 ppm HALS (35); 36 ppm P
11) 670 ppm Phos1; 330 ppm benzofuranone (109); 250 ppm HALS (35); 32 ppm P
12) 500 ppm Phos1; 500 ppm benzofuranone (109); 250 ppm HALS (35); 43 ppm P Additives are blended with granular polymer free of any stabilization additives. In addition to the additives listed, all formulations are blended with 840 ppm zinc oxide. Thoroughly blended formulations are melt compounded in a twin screw extruder at 210° C. under nitrogen. The compounded formulations are extruded multiple times in a single screw extruder fitted with a Maddock mixing section at 260° C., open to air. Pelletized samples of the third pass extrudate are compression molded into 3.2 mm plaques. Results are below.

| formulation | YI | melt flow (zero pass) | melt flow (fifth pass) | OIT |
|---|---|---|---|---|
| 1 | 3.5 | 2.00 | 1.49 | 67 |
| 2 | 3.9 | 2.00 | 1.77 | 106 |
| 3 | 3.3 | 2.04 | 1.69 | 128 |
| 4 | 1.3 | 2.05 | 1.66 | 46 |
| 5 | 2.0 | 2.04 | 1.29 | 9 |
| 6 | 4.1 | 2.08 | 1.43 | 11 |
| 7 | 3.3 | 1.97 | 1.53 | 12 |
| 8 | 3.3 | 2.02 | 1.62 | 19 |
| 9 | 3.5 | 1.97 | 1.19 | 21 |
| 10 | 2.6 | 2.06 | 1.25 | 23 |
| 11 | 3.2 | 2.07 | 1.52 | 24 |
| 12 | 4.0 | 1.96 | 1.65 | 31 |

What is claimed is:

1. A method of preparing a polyolefin composition, comprising:
   combining:
   i) a polyolefin,
   ii) one or more benzofuranone compounds selected from the group consisting of:
   formulas 125-132

125
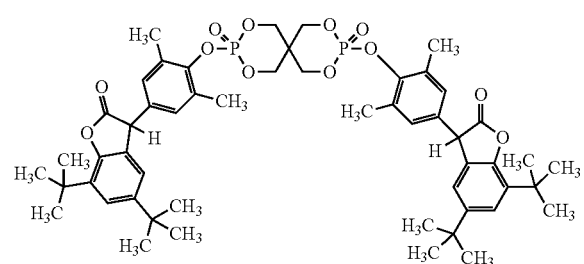

126
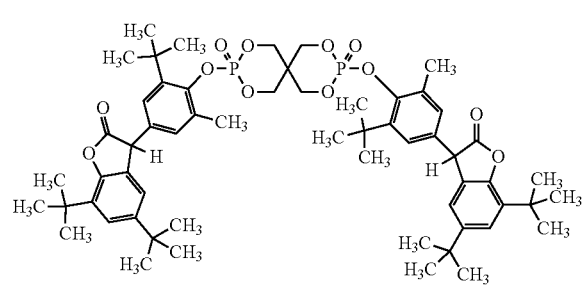

127
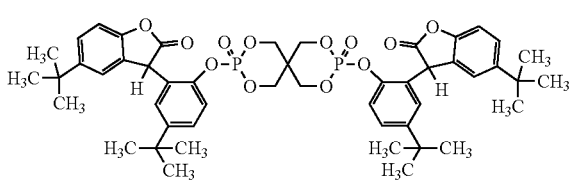

128
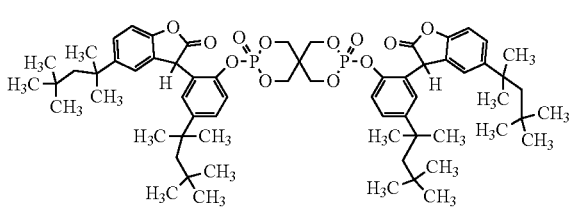

129
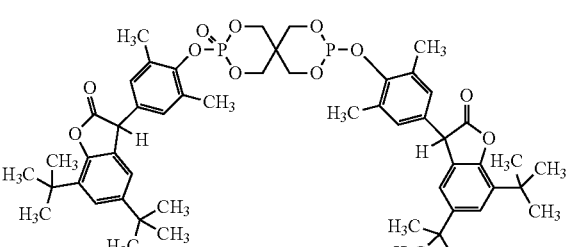

130
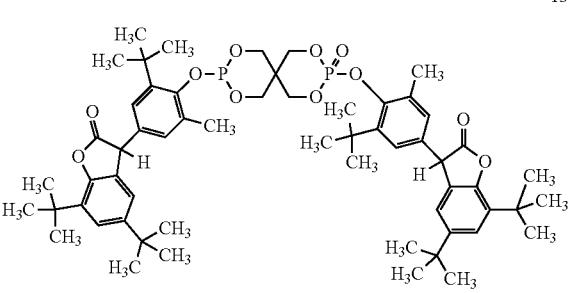

131
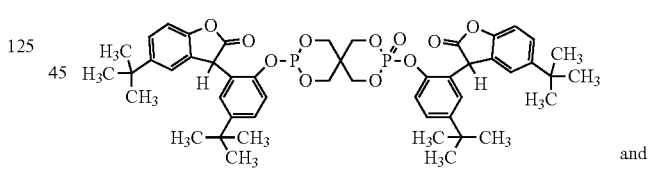

and

132
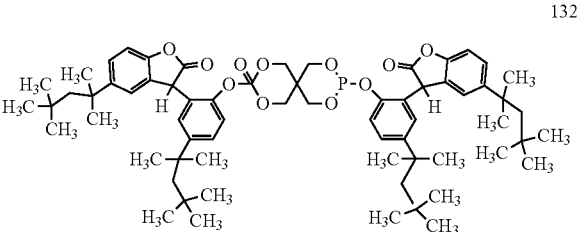

and iii) one or more hindered amine light stabilizers, wherein the one or more hindered amine light stabilizers are selected from the group consisting of:
(1) 1-cyclohexyloxy-2,2,6,6-tetramethyl-4-octadecylaminopiperidine,
(2) bis(2,2,6,6-tetramethylpiperidin-4-yl) sebacate, (3) bis(1-acetoxy-2,2,6,6-tetramethylpiperidin-4-yl) sebacate,
(4) bis(1,2,2,6,6-pentamethylpiperidin-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate,
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate,
(9) 2,4-bis[(1-cyclohexyloxy-2,2,6,6-tetramethylpiperidin-4-yl)butylamino]-6-(2-hydroxyethylamino)-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl) butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 2,2,6,6-tetramethylpiperidin-4-yl octadecanoate,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxo-spiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrolidin-2,5-dione,
(32) 3-dodecyl-1-(1,2,2,6,6-pentamethyl-4-piperidyl) pyrrolidine-2,5-dione,
(33) N,N'-bis-formyl-N,N'-bis(2,2,6,6-tetramethyl-4-piperidyl)hexamethylenediamine,
(33a) bis(1-undecanyloxy-2,2,6,6-tetramethylpiperidin-4-yl)carbonate,
(34) reaction product of 2,4-bis[(1-cyclohexyloxy-2,2,6,6-piperidin-4-yl)-butylamino]-6-chloro-5-triazine with N,N'-bis(3-aminopropyl)ethylenediamine),
(35) condensate of 1-(2-hydroxyethyl)-2,2,6,6-tetramethyl-4-hydroxypiperidine and succinic acid,

(36) condensate of N,N'-bis(2,2,6,6-tetramethyl-4-piperidyl)-hexamethylenediamine and 4-tert-octylamino-2,6-dichloro-1,3,5-triazine,
(37) condensate of N,N'-bis(2,2,6,6-tetramethyl-4-piperidyl)-hexamethylenediamine and 4-cyclohexylamino-2,6-dichloro-1,3,5-triazine,
(38) condensate of N,N'-bis-(2,2,6,6-tetramethyl-4-piperidyl)hexamethylenediamine and 4-morpholino-2,6-dichloro-1,3,5-triazine,
(39) condensate of N,N'-bis-(1,2,2,6,6-pentamethyl-4-piperidyl)-hexamethylenediamine and 4-morpholino-2,6-dichloro-1,3,5-triazine,
(40) condensate of 2-chloro-4,6-bis(4-n-butylamino-2,2,6,6-tetramethylpiperidyl)-1,3,5-triazine and 1,2-bis(3-aminopropylamino)ethane,
(41) condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro [4,5]decane and epichlorohydrin,
(43) poly[methyl,(3-oxy-(2,2,6,6-tetramethylpiperidin-4-yl)propyl)] siloxane, CAS #182635-99-0,
(44) reaction product of maleic acid anhydride-$C_{18}$-$C_{22}$-α-olefin-copolymer with 2,2,6,6-tetramethyl-4-aminopiperidine,
(45) oligomeric condensate of 4,4'-hexamethylenebis (amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis (dibutylamino)-s-triazine,
(46) oligomeric condensate of 4,4'-hexamethylenebis (amino-1,2,2,6,6-pentaamethyl-piperidine) and 2,4-dichloro-6-[(1,2,2,6,6-pentaamethylpiperidin-4-yl) butylamino]-s-triazine end-capped with 2-chloro-4,6-bis(dibutylamino)-s-triazine,
(47) oligomeric condensate of 4,4'-hexamethylenebis (amino-1-propoxy-2,2,6,6-tetramethyl piperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
(48) oligomeric condensate of 4,4'-hexamethylenebis (amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine,
(49) product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine,
(50) (4-piperidinol, 2,2,6,6-tetramethyl-1-(undecyloxy))-, 4,4'-carbonate, and
(51) 1,3,5-triazine-2,4,6-triamine, N2,N2'-1,6-hexanediylbis[N4,N6-dibutyl-N2,N4,N6-tris(2,2,6,6-tetramethyl-4-piperidinyl)-, N-propoxy.

2. The method according to claim 1, wherein the polyolefin comprises polypropylene.

3. The method according to claim 1, wherein the polyolefin comprises polyethylene.

4. The method according to claim 1, wherein the one or more hindered amine light stabilizers are selected from the group consisting of
(2) bis(2,2,6,6-tetramethylpiperidin-4-yl) sebacate,
(20) 2,2,6,6-tetramethylpiperidin-4-yl octadecanoate,
(14) 1-(2-hydroxy-2-methylpropoxy)-4-octadecanoyloxy-2,2,6,6-tetramethyl-piperidine,

(33) N,N'-bis-formyl-N,N'-bis(2,2,6,6-tetramethyl-4-piperidyl)hexamethylenediamine,

(34) reaction product of 2,4-bis[(1-cyclohexyloxy-2,2,6,6-piperidin-4-yl)-butylamino]-6-chloro-s-triazine with N,N'-bis(3-aminopropyl)ethylenediamine),

(35) condensate of 1-(2-hydroxyethyl)-2,2,6,6-tetramethyl-4-hydroxypiperidine and succinic acid,

(36) condensate of N,N'-bis(2,2,6,6-tetramethyl-4-piperidyl)-hexamethylenediamine and 4-tert-octylamino-2,6-dichloro-1,3,5-triazine,

(38) condensate of N,N'-bis-(2,2,6,6-tetramethyl-4-piperidyl)-hexamethylenediamine and 4-morpholino-2,6-dichloro-1,3,5-triazine,

(39) condensate of N,N'-bis-(1,2,2,6,6-pentamethyl-4-piperidyl)-hexamethylenediamine and 4-morpholino-2,6-dichloro-1,3,5-triazine,

(41) condensate of 2-chloro-4,6-di-(4-n-butylamino-1,2,2,6,6-pentamethylpiperidyl)-1,3,5-triazine and 1,2-bis-(3-aminopropylamino)ethane,

(44) reaction product of maleic acid anhydride-$C_{18}$-$C_{22}$-α-olefin-copolymer with 2,2,6,6-tetramethyl-4-aminopiperidine,

(45) oligomeric compound condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine, and

(47) oligomeric compound condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutyl-amino)-s-triazine and binary or ternary combinations thereof.

5. The method according to claim 1, wherein the one or more hindered amine light stabilizers are selected from the group consisting of

(14) 1-(2-hydroxy-2-methylpropoxy)-4-octadecanoyloxy-2,2,6,6-tetramethyl-piperidine,

(34) reaction product of 2,4-bis[(1-cyclohexyloxy-2,2,6,6-piperidin-4-yl)-butylamino]-6-chloro-s-triazine with N,N'-bis(3-aminopropyl)ethylenediamine),

(35) condensate of 1-(2-hydroxyethyl)-2,2,6,6-tetramethyl-4-hydroxypiperidine and succinic acid,

(36) condensate of N,N'-bis(2,2,6,6-tetramethyl-4-piperidyl)-hexamethylenediamine and 4-tert-octylamino-2,6-dichloro-1,3,5-triazine,

(41) condensate of 2-chloro-4,6-di-(4-n-butylamino-1,2,2,6,6-pentamethylpiperidyl)-1,3,5-triazine and 1,2-bis-(3-aminopropylamino)ethane,

(45) oligomeric compound condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine, and

(47) oligomeric compound condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutyl-amino)-s-triazine and binary or ternary combinations thereof.

6. The method according to claim 1, wherein the polyolefin composition comprises essentially no hindered phenolic antioxidants.

7. The method according to claim 1, wherein the polyolefin composition further comprises one or more organophosphorus stabilizers.

8. The method according to claim 1, wherein the one or more benzofuranone compounds are present from about 20 ppm to about 1000 ppm by weight, based on the weight of the polyolefin.

9. The method according to claim 1, wherein the one or more hindered amine light stabilizers are present from about 20 ppm to about 1000 ppm by weight, based on the weight of the polyolefin.

10. The method according to claim 1, wherein a weight/weight ratio of the one or more benzofuranone compounds to the one or more hindered amine light stabilizers is from about 0.05 to about 1.0.

11. The method according to claim 1, wherein the polyolefin composition further comprises one or more ultraviolet light absorbers.

12. The method according to claim 1, wherein the polyolefin composition is in the form of at least one of extrudates, pellets or compressed solids.

13. A method of forming a shaped article, comprising:
melt blending a polyolefin composition; and
forming the shaped article,
wherein the polyolefin composition comprises:
i) a polyolefin,
ii) one or more benzofuranone compounds selected from the group consisting of formulas 125-132

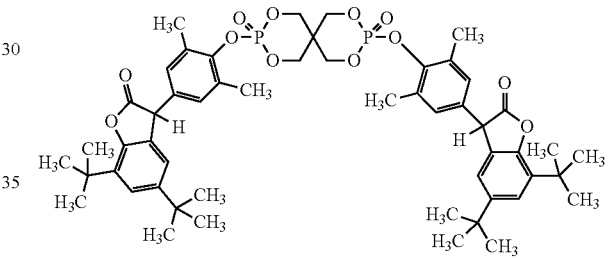

125

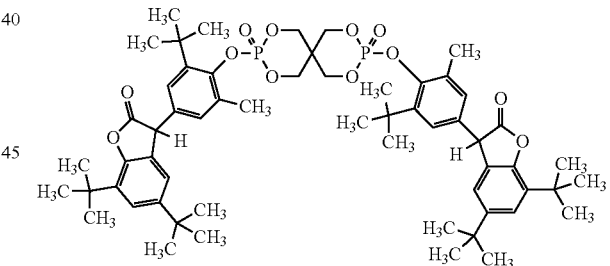

126

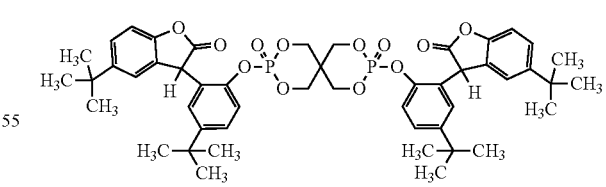

127

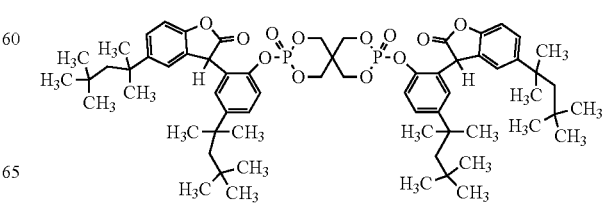

128

-continued

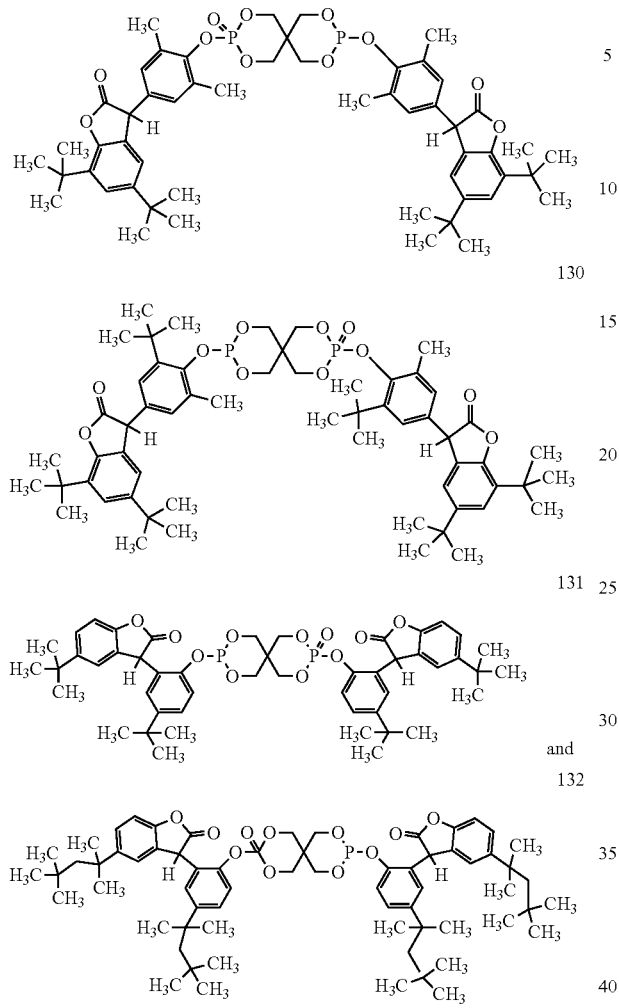

and iii) one or more hindered amine light stabilizers, wherein the one or more hindered amine light stabilizers are selected from the group consisting of:
(1) 1-cyclohexyloxy-2,2,6,6-tetramethyl-4-octadecylaminopiperidine,
(2) bis(2,2,6,6-tetramethylpiperidin-4-yl) sebacate,
(3) bis(1-acetoxy-2,2,6,6-tetramethylpiperidin-4-yl) sebacate,
(4) bis(1,2,2,6,6-pentamethylpiperidin-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate,
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate,
(9) 2,4-bis[(1-cyclohexyloxy-2,2,6,6-tetramethylpiperidin-4-yl)butylamino]-6-(2-hydroxyethyl amino-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl) butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 2,2,6,6-tetramethylpiperidin-4-yl octadecanoate,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxo-spiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl) pyrrolidine-2,5-dione,
(33) N,N'-bis-formyl-N,N'-bis(2,2,6,6-tetramethyl-4-piperidyl)hexamethylenediamine,
(33a) bis(1-undecanyloxy-2,2,6,6-tetramethylpiperidin-4-yl)carbonate,
(34) reaction product of 2,4-bis[(1-cyclohexyloxy-2,2,6,6-piperidin-4-yl)butylamino]-6-chloro-5-triazine with N,N'-bis(3-aminopropyl)ethylenediamine),
(35) condensate of 1-(2-hydroxyethyl)-2,2,6,6-tetramethyl-4-hydroxypiperidine and succinic acid,
(36) condensate of N,N'-bis(2,2,6,6-tetramethyl-4-piperidyl)-hexamethylenediamine and 4-tert-octylamino-2,6-dichloro-1,3,5-triazine,
(37) condensate of N,N'-bis(2,2,6,6-tetramethyl-4-piperidyl)-hexamethylenediamine and 4-cyclohexylamino-2,6-dichloro-1,3,5-triazine,
(38) condensate of N,N'-bis-(2,2,6,6-tetramethyl-4-piperidyl)hexamethylenediamine and 4-morpholino-2,6-dichloro-1,3,5-triazine,
(39) condensate of N,N'-bis-(1,2,2,6,6-pentamethyl-4-piperidyl)hexamethylenediamine and 4-morpholino-2,6-dichloro-1,3,5-triazine,
(40) condensate of 2-chloro-4,6-bis(4-n-butylamino-2,2,6,6-tetramethylpiperidyl)-1,3,5-triazine and 1,2-bis(3-aminopropylamino)ethane,
(41) condensate of 2-chloro-4,6-di-(4-n-butylamino-1,2,2,6,6-pentamethylpiperidyl)-1,3,5-triazine and 1,2-bis-(3-aminopropylamino)ethane,

(42) a reaction product of 7,7,9,9-tetramethyl-2-cycloundecyl-1-oxa-3,8-diaza-4-oxospiro [4,5]decane and epichlorohydrin,

(43) poly[methyl,(3-oxy-(2,2,6,6-tetramethylpiperidin-4-yl)propyl)] siloxane, CAS #182635-99-0,

(44) reaction product of maleic acid anhydride-$C_{18}$-$C_{22}$-α-olefin-copolymer with 2,2,6,6-tetramethyl-4-aminopiperidine,

(45) oligomeric condensate of 4,4'-hexamethylenebis (amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,

(46) oligomeric condensate of 4,4'-hexamethylenebis (amino-1,2,2,6,6-pentaamethyl-piperidine) and 2,4-dichloro-6-[(1,2,2,6,6-pentaamethylpiperidin-4-yl) butylamino]-s-triazine end-capped with 2-chloro-4,6-bis(dibutylamino)-s-triazine,

(47) oligomeric condensate of 4,4'-hexamethylenebis (amino-1-propoxy-2,2,6,6-tetramethyl piperidine) and 2,4-dichloro-6-[(1-propoxy-2,2,6,6-tetramethylpiperidin-4- yl)butylamino]-s-triazine end-capped with 2-chloro-4,6-bis(dibutylamino)-s-triazine,

(48) oligomeric condensate of 4,4'-hexamethylenebis (amino-1-acyloxy-2,2,6,6-tetramethyl piperidine) and 2,4-dichloro-6-[(1-acyloxy-2,2,6,6-tetramethylpiperidin-4-yl)butylamino]-s-triazine, end-capped with 2-chloro-4,6-bis(dibutylamino)-s-triazine,

(49) product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine,

(50) (4-piperidinol, 2,2,6,6-tetramethyl-1-(undecyloxy))-, 4,4'-carbonate, and

(51) 1,3,5-triazine-2,4,6-triamine, N2,N2'-1,6-hexanediylbis[N4,N6-dibutyl-N2,N4,N6-tris(2,2,6,6-tetramethyl-4-piperidinyl)-, N-propoxy.

\* \* \* \* \*